US012736625B2

(12) United States Patent
Yomo et al.

(10) Patent No.: US 12,736,625 B2
(45) Date of Patent: Sep. 15, 2026

(54) RADAR APPARATUS AND POINT CLOUD GENERATION METHOD

(71) Applicant: Panasonic Intellectual Property Management Co., Ltd., Osaka (JP)

(72) Inventors: Hidekuni Yomo, Kanagawa (JP); Tomohiro Yui, Kanagawa (JP); Takaaki Kishigami, Tokyo (JP); Noriaki Saito, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 292 days.

(21) Appl. No.: 18/421,556

(22) Filed: Jan. 24, 2024

(65) Prior Publication Data

US 2024/0288547 A1 Aug. 29, 2024

(30) Foreign Application Priority Data

Jan. 26, 2023 (JP) ................................ 2023-010158

(51) Int. Cl.
*G01S 7/41* (2006.01)
*G01S 13/536* (2006.01)
*G01S 17/931* (2020.01)

(52) U.S. Cl.
CPC ............ *G01S 7/415* (2013.01); *G01S 13/536* (2013.01); *G01S 17/931* (2020.01)

(58) Field of Classification Search
CPC ....... G01S 7/415; G01S 17/931; G01S 13/536
See application file for complete search history.

(56) References Cited

U.S. PATENT DOCUMENTS

2007/0030131 A1* 2/2007 Takahama ............... G01S 17/86 340/435
2018/0267558 A1* 9/2018 Tiwari .................. H04N 23/90
2022/0135074 A1* 5/2022 Armstrong-Crews ....................... G01S 7/4808 701/23
2022/0383749 A1* 12/2022 Ishikawa ................ G06V 20/70
2023/0213640 A1* 7/2023 Kuroda .................. G01S 13/44 342/28
2024/0151813 A1* 5/2024 Fischer ................ G01S 7/4039

FOREIGN PATENT DOCUMENTS

JP 2011191227 A 9/2011
JP 5700940 B2 4/2015
JP 2017166846 A 9/2017
JP 2022511990 A 2/2022

OTHER PUBLICATIONS

Jin et al., "Comparison of Different Approaches for Identification of Radar Ghost Detections in Automotive Scenarios," IEEE Radar Conference, May 2021. (7 pages).

* cited by examiner

*Primary Examiner* — Nazra Nur Waheed
(74) *Attorney, Agent, or Firm* — Seed Intellectual Property Law Group LLC

(57) ABSTRACT

A radar apparatus includes signal processing circuitry, which, in operation, generates point cloud data for each frame based on a reflection wave signal resulting from a radar signal reflected by an object; extracting circuitry, which, in operation, extracts a first point cloud corresponding to a stationary object from the point cloud data; and superimposing circuitry, which, in operation, superimposes the point cloud data of a current frame and the first point cloud of a past frame.

20 Claims, 21 Drawing Sheets

RADAR APPARATUS AND POINT CLOUD GENERATION METHOD

TECHNICAL FIELD

The present disclosure relates to a radar apparatus and a point cloud generation method.

BACKGROUND ART

In recent years, a radar system using a millimeter-wave band, the detection performance of which is relatively not degraded even in an environment with poor visibility such as snowfall or thick fog, has been attracting attention as a sensor for safety assurance such as collision prevention or for realizing automatic driving.

CITATION LIST

Patent Literature

PTL 1

Japanese Patent No. 5700940

PTL 2

Japanese Unexamined Patent Application Publication (Translation of PCT Application) No. 2022-511990

Non Patent Literature

NPL 1

Yi Jin, and 5 others, "Comparison of Different Approaches for Identification of Radar Ghost Detections in Automotive Scenarios", May, 2021, IEEE Radar Conference

SUMMARY OF INVENTION

There is scope for further study, however, on a method for improving object detection accuracy in a radar apparatus.

One non-limiting and exemplary embodiment facilitates providing a radar apparatus capable of improving object detection accuracy in the radar apparatus.

A radar apparatus according to an embodiment of the present disclosure includes: signal processing circuitry, which, in operation, generates point cloud data for each frame based on a reflection wave signal resulting from a radar signal reflected by an object; extracting circuitry, which, in operation, extracts a first point cloud corresponding to a stationary object from the point cloud data; and superimposing circuitry, which, in operation, superimposes the point cloud data of a current frame and the first point cloud of a past frame.

It should be noted that general or specific embodiments may be implemented as a system, an apparatus, a method, an integrated circuit, a computer program, a storage medium, or any selective combination thereof.

According to an exemplary embodiment of the present disclosure, it is possible to improve object detection accuracy in a radar apparatus.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
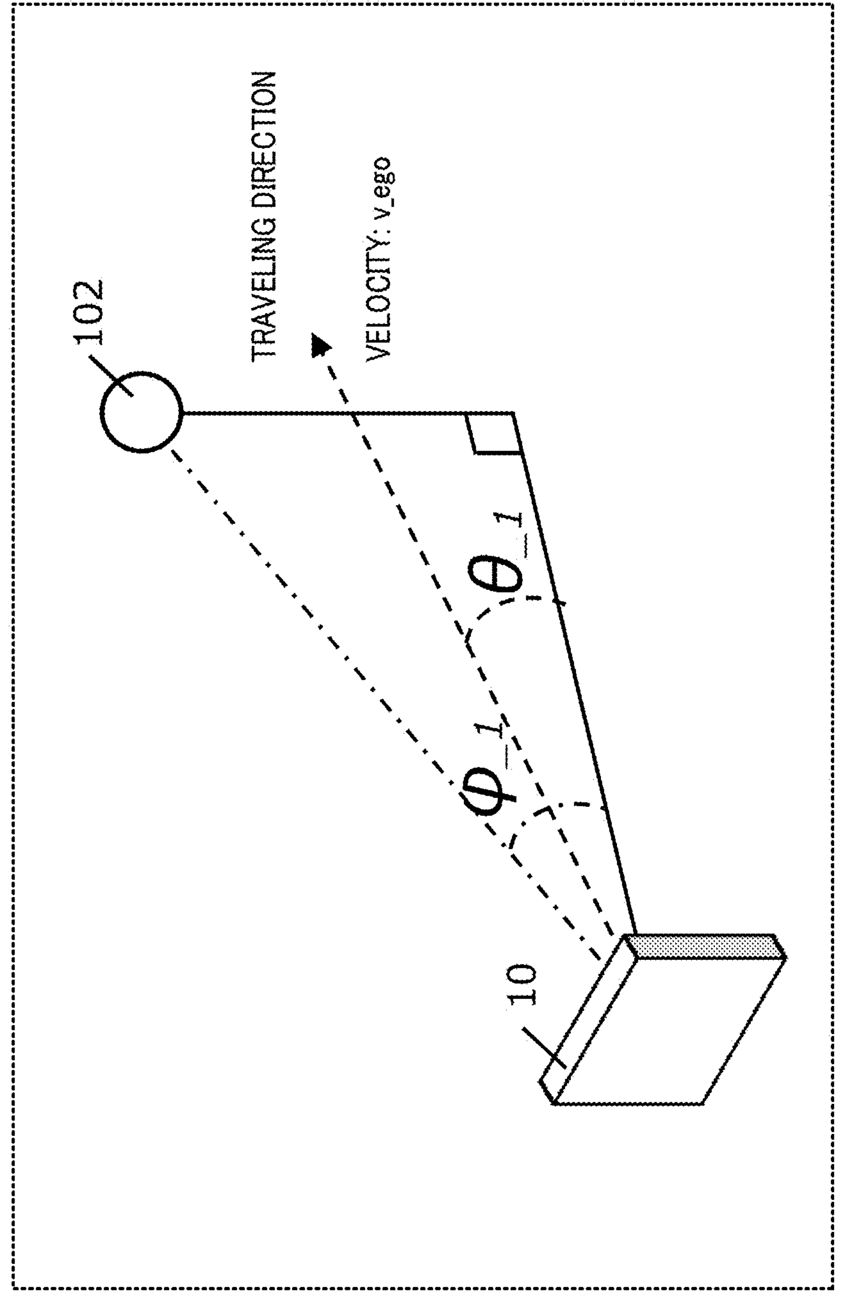
FIG. 1 is a bird's-eye view illustrating an exemplary positional relationship between a radar direction of travel and a reflection object.

Hereinafter, embodiments of the present disclosure will be described in detail with reference to the accompanying drawings. In the embodiments, the same components are denoted by the same reference signs, and the repetitive descriptions thereof are omitted.

Until now, in a case where a detection target (or sensing target) area includes a limited and relatively simple number or type of objects as in an automobile-only road, the function of a radar apparatus is enough to detect the range to and the horizontal direction of a detection target object. In this case, the object to be detected by the radar apparatus according to the conventional technique is a moving object such as a traveling vehicle, and a stationary object such as a road-mounted object or a parked vehicle is excluded from the detection target. This is because control such as sudden braking of a vehicle is possibly performed by accidentally detecting a stationary object such as a sign, an overpass, or a manhole on a road, which does not need to be detected by the radar apparatus, and thus a stationary object is excluded from the detection target in terms of preventing such a control operation.

For this reason, a millimeter-wave radar apparatus has been implemented with a relatively small number of antennas such as three transmission antennas and four reception antennas, for example.

Meanwhile, there is an increasing demand for expanding the use case of a radar apparatus to traveling in a place such as a parking lot in an urban area or a shopping mall. Such a place has a complex environment with many objects of different types. Thus, as a function of a radar apparatus, a function of detecting the vertical elevation angle is required in addition to the above-described function of detecting the range to a detection target and the horizontal azimuth where the detection target is located.

In addition, a required function in the radar apparatus instead of the processing of excluding a stationary object from the detection target is a function of including a stationary object possibly causing collision, such as a parked vehicle, in the detection target while excluding a stationary object at a high position not interfering with traveling of a vehicle from the detection target.

Even in an environment such as an automobile-only road, when a vehicle is in a traffic jam and has to repeat stopping and traveling at a low speed, a function of accurately distinguishing and detecting an object not interfering with traveling, such as a sign, an overpass, or a joint of a bridge, and an object restricting a traveling direction, such as a stopped vehicle around the vehicle, is desired.

A radar apparatus according to a conventional technique exhibits sufficient detection performance when at least one of a target and the radar moves, but the detection performance of the radar apparatus is likely to be deteriorated when both a target and the radar are stopped.

For example, when both a target and the radar are stopped, the frequency shift due to the Doppler effect is unlikely to occur; accordingly, the difference in the frequency shift due to the difference in the azimuth or the elevation angle is unlikely to exist, and when there are a plurality of reflection points equidistant, the radar apparatus receives a combined wave of the same frequency in which a plurality of reflection waves overlap each other. Thus, when the antenna aperture length of the radar apparatus is not large enough, for example, sufficient angular resolution cannot possibly be obtained. Meanwhile, when at least one of a target or the radar moves, the radar apparatus can utilize the Doppler effect, and a difference in the frequency shift occurs due to a difference in the azimuths or elevation angles of locations of individual reflection points. Thus, a reflection wave of the Doppler frequency corresponding to the angle of the location of each reflection points is obtained and the reflection waves are distributed in the Doppler frequency domain, thereby improving the angular resolution and obtaining a sufficient detection performance even when the antenna aperture length of the radar apparatus is not large enough.

For example, when a radar apparatus determines the type of a target based on point cloud output from Light Detection And Ranging (LiDAR), the radar apparatus possibly determines the type of the target incorrectly due to the insufficient density of the point cloud. With this regard, in order to increase the density of the point cloud, a technique has been proposed in which a point cloud of the past frame is superimposed while compensating for the relative movement amount or rotation amount of the target between consecutive frames, and the type determination of the target is performed based on the superimposition result (see, for example, PTL 1).

Further, when detecting a traffic line drawn on a road such as a white line, the position or posture of a vehicle is different between frames, and thus a technique has been proposed in which the point cloud of the past frame is superimposed on the point cloud of the latest frame by performing a transformation such as position shifting for compensating for the position or posture of the vehicle (see, for example, PTL 2).

In addition, since the point cloud density of the radar apparatus is coarser than that of LiDAR and the performance of deep learning cannot be sufficiently extracted, a technique has been proposed in which the point cloud of stationary objects detected within a predetermined period of time in the past is superimposed while the position of a vehicle (e.g., vehicle on which the radar apparatus is mounted) in the latest frame is compensated (see, for example, NPL 1).

In one non-limiting embodiment of the present disclosure, a description will be given of a technique for assisting safe traveling by detecting the shape of an obstacle including a stationary object using a radar apparatus and accurately determining a space where a vehicle can travel.

A radar apparatus according to a non-limiting embodiment of the present disclosure may be mounted on a vehicle, for example. The mounting position of the radar apparatus is not limited to the inside of a bumper, and may be a roof, a side mirror, or a fender. Note that the mounting of the radar apparatus is not limited thereto, and can be applied to, for example, a small package delivery vehicle that travels at a low speed in a place such as a sidewalk.

For example, the radar apparatus is capable of estimating the shape etc. without deterioration of the point cloud density of a stationary object even when a vehicle on which the radar apparatus is mounted is stopped, by superimposing the point cloud obtained in the past frame on the point cloud of the latest frame in a system performing control such as collision prevention based on point cloud output from a radar signal processor that estimates the range, azimuth, and elevation angle. In addition, the radar apparatus can appropriately grasp the latest status even when the surrounding stopping vehicle starts moving while the vehicle is stopped, thereby enabling accurate space detection (or space sensing) and the like.

Embodiment 1

For a radar apparatus having a transmission antenna composed of a plurality of arrays and a reception antenna composed of a plurality of arrays, arranging the arrays in both the horizontal and vertical directions realizes a 3D radar apparatus capable of simultaneously obtaining the vertical elevation angle and the horizontal azimuth of a reflection object.

Utilizing the 3D radar apparatus enables determination of whether a reflection wave is from an object unlikely to cause collision (or a passable object), such as a sign and an overpass located at a height not interfering with traveling, a manhole on a road, or a joint between roads, or it is from an object likely to cause collision (or an object that is difficult to pass), such as a stopped vehicle. This makes it possible to include stationary objects in detection targets of the radar apparatus without limiting the targets to moving obstacles.

For example, as illustrated in FIG. 1, when a vehicle equipped with radar apparatus 10 toward the traveling direction travels at velocity v_ego and stationary reflection object (also referred to as a stationary object) 102 located at azimuth θ_1 and elevation angle φ_1 is detected, Doppler frequency f_d1 observed in radar apparatus 10 is represented by following expression 1, where the center frequency of a transmission signal is f_0 and the speed of light is c.

(1)

$$f\_d1 = (2 \cdot v\_ego \cdot f\_0 \cdot \cos\theta\_1 \cdot \cos\varphi\_1)/c \quad \text{(Expression 1)}$$

Figure 2:
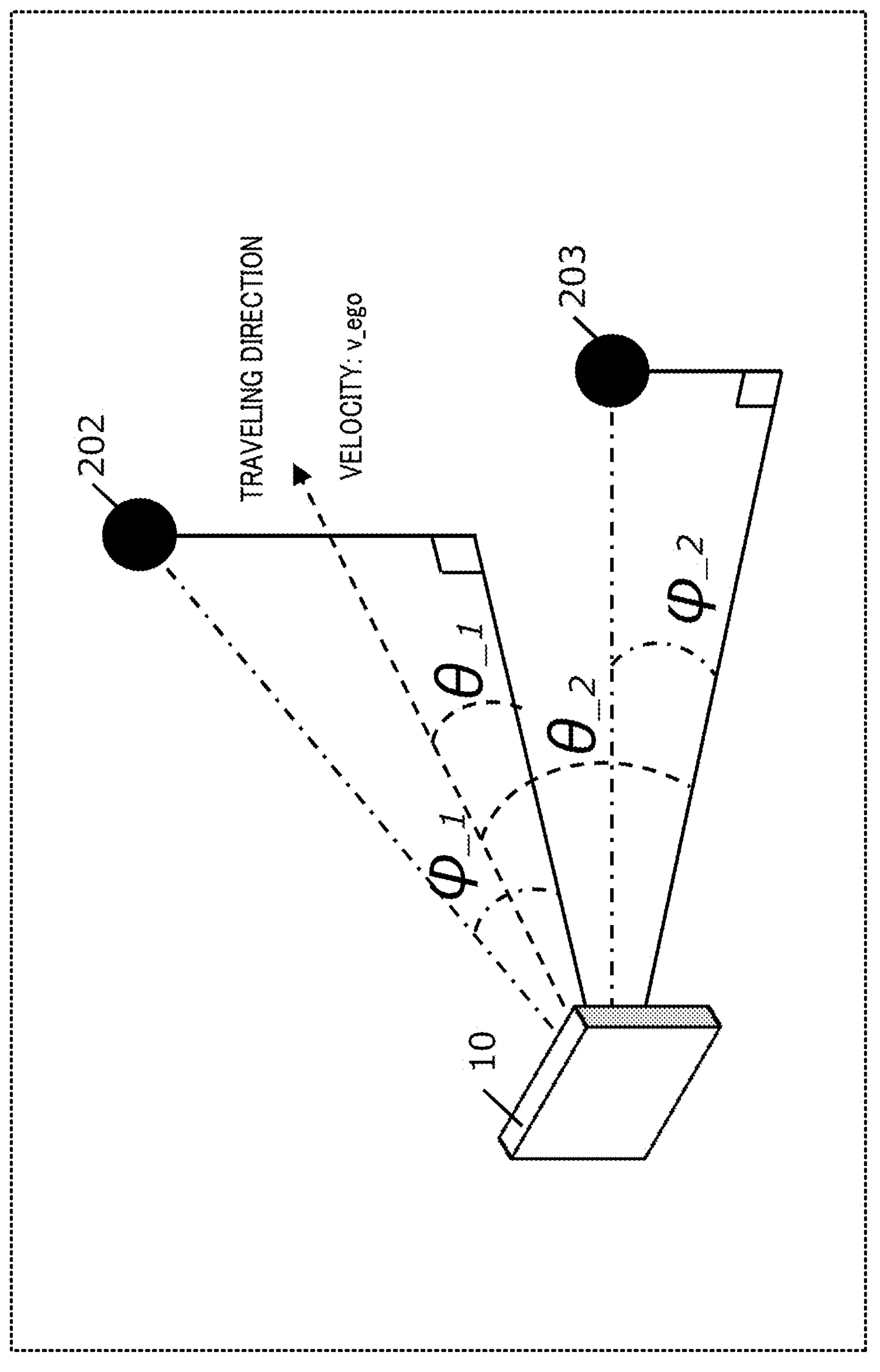
FIG. 2 is a bird's-eye view illustrating an exemplary positional relationship between a radar direction of travel and a plurality of reflection objects.

Further, as illustrated in FIG. 2, when stationary reflection object 203 is located at a range equal to the range from radar apparatus 10 to stationary reflection object 202 and at a different angle (azimuth θ_2, elevation angle φ_2, where |θ_1|≠θ_2| or |φ_1|≠φ_2|), Doppler frequency component f_d2 represented by following equation 2 is included in the Doppler frequency observed in radar apparatus 10 in addition to Doppler frequency component f_d1.

(2)

$$f\_d2 = (2 \cdot v\_ego \cdot f\_0 \cdot \cos\theta\_2 \cdot \cos\varphi\_2)/c \quad \text{(Expression 2)}$$

Thus, radar apparatus 10 can easily detect two reflection objects present at equal ranges separately by, for example, detecting (or observing) the Doppler frequency by a radar signal processor, which will be described later.

Figure 3:
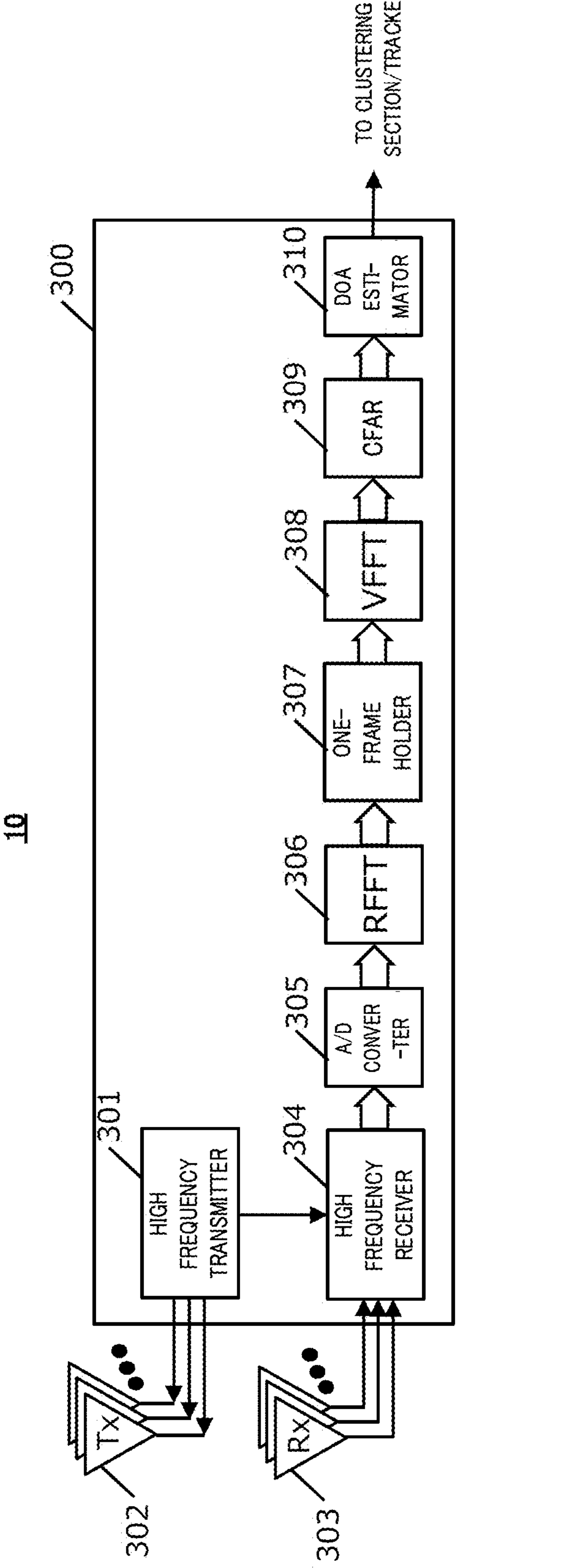
FIG. 3 illustrates an exemplary configuration of a signal processor etc. of a radar apparatus.

FIG. 3 illustrates an exemplary configuration of radar apparatus 10 adopting fast-chirp modulation (FCM) in which frequency is modulated in the form of fast pulses as a radar system.

Radar apparatus 10 illustrated in FIG. 3 includes transmission and reception antennas and radar signal processor 300. The transmission and reception antennas may be composed of, for example, transmission antenna 302 configured by a plurality of arrays and reception antenna 303 configured by a plurality of arrays.

Radar signal processor 300 includes, for example, high frequency transmitter 301, high frequency receiver 304, A/D converter 305, Range-Fast Fourier Transform (RFFT) 306, one-frame holder 307, Velocity-FFT (VFFT) 308, Constant False Alarm Rate (CFAR) 309, and Direction of Arrival (DOA) estimator 310.

High frequency transmitter 301 outputs a radar signal (e.g., chirp signal or FCM signal) to transmission antenna 302. High frequency receiver 304 outputs a beat signal by mixing the signal from reception antenna 303 with a transmission signal.

A/D converter 305 performs analog-to-digital conversion on the beat signal. RFFT 306 performs Fast Fourier Transform (FFT) on each received chirp signal, and derives a range to a reflection object. One-frame holder 307 holds the signal outputted from RFFT 306 in a memory etc. for one frame. VFFT 308 performs FFT on one frame of a complex signal outputted from the RFFT for each range bin (each index value in the range direction) from the signal held for one frame, and obtains a complex signal for each Doppler frequency bin corresponding to the Doppler velocity.

CFAR 309 extracts a combination of the range bin and Doppler frequency bin for which the power at the output of VFFT 308 exceeds a predetermined threshold and a reflection object is likely to be present. DOA estimator 310 estimates the direction of arrival by correlating a direction vector with a complex signal from each reception antenna system in the range bin and Doppler frequency bin extracted by CFAR 309.

In this way, radar apparatus 10 transmits a radio wave (transmission wave), for example, and receives a wave reflected by an object in a detection target area. Radar apparatus 10 (radar signal processor 300) generates, for each frame, information related to a set of reflection points (hereinafter, referred to as "point cloud") corresponding to a detection target (the information is hereinafter referred to as "point cloud data"), for example, based on the received reflection wave signal. Radar apparatus 10 may output the generated point cloud data to an external apparatus (e.g., clustering section/tracker). In the point cloud data, the point cloud corresponding to one detection target object (e.g., one vehicle) is not limited to one point cloud, and two or more point clouds possibly appear.

Figure 4:
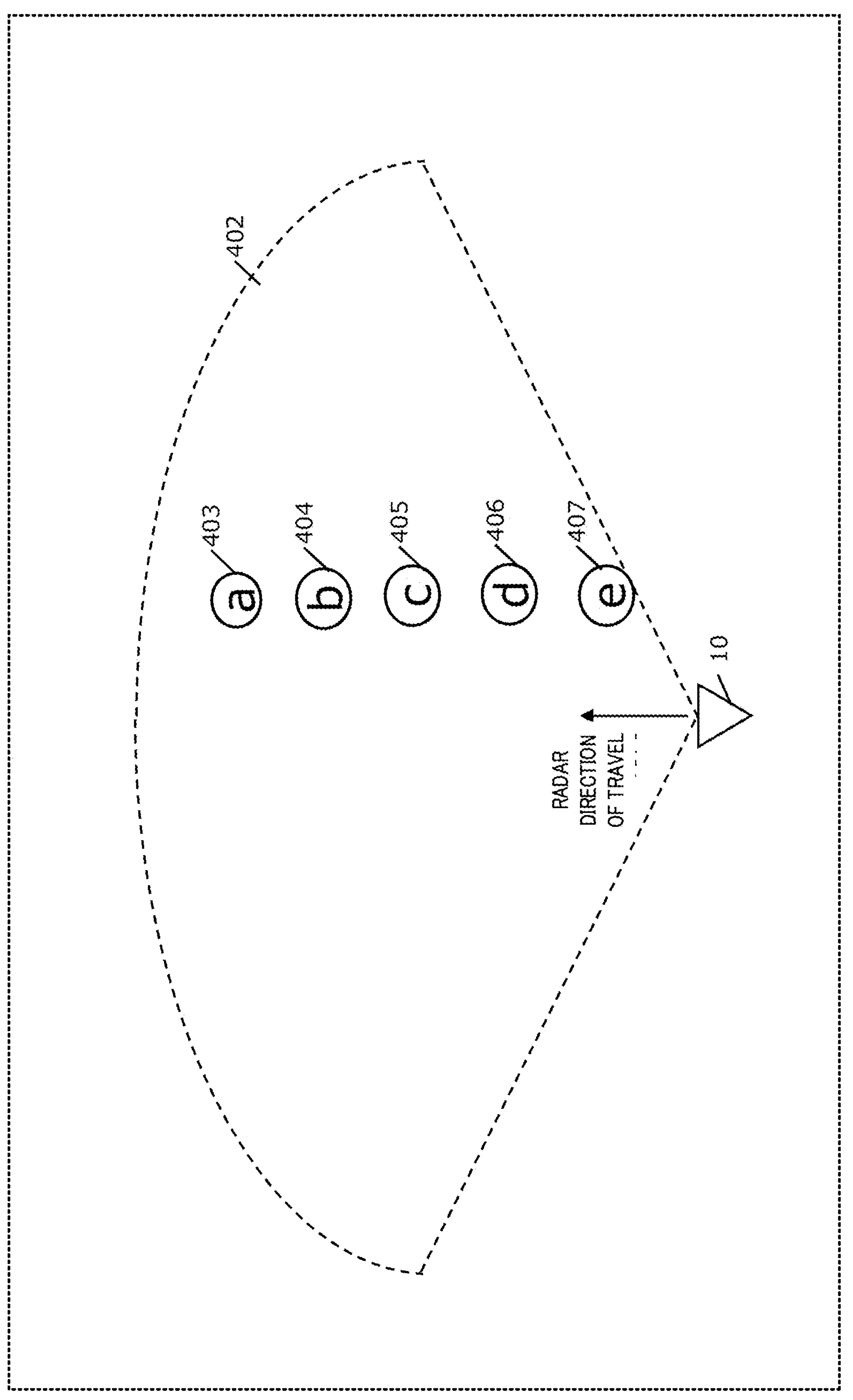
FIG. 4 is a top view illustrating an exemplary positional relationship between a radar direction of travel and a plurality of reflection objects.

For example, as illustrated in FIG. 4, it is assumed that stationary objects a (403), b (404), c (405), d (406), and e (407) are present in detection target area 402 of radar apparatus 10 when viewed from the vertical direction and radar apparatus 10 (vehicle) travels in the direction of the arrow.

Figure 5:
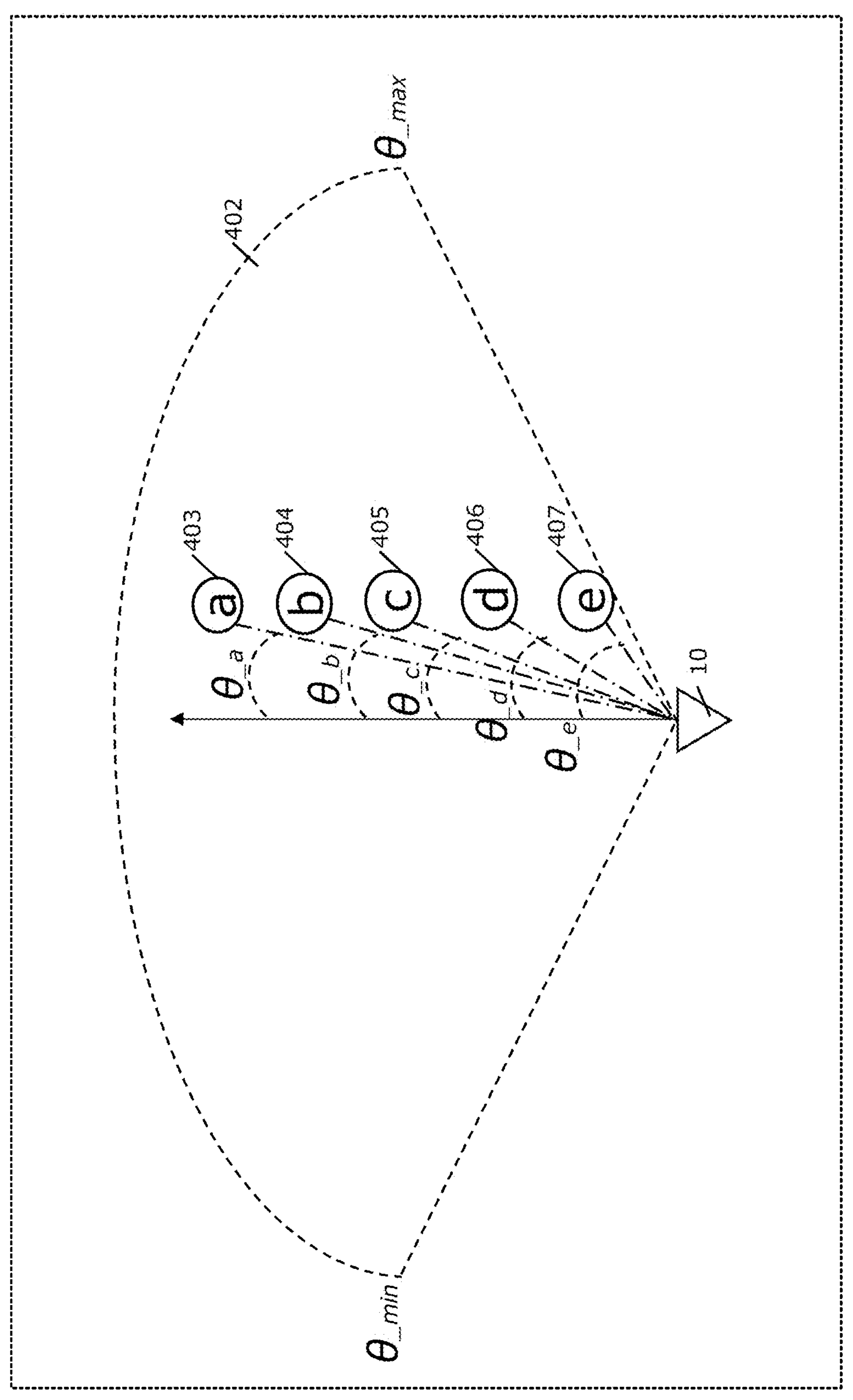
FIG. 5 is a top view illustrating an exemplary positional relationship between a radar direction of travel and a plurality of reflection objects, and exemplary azimuths.

In this case, as illustrated in FIG. 5, results of direction-of-arrival estimation for the stationary objects are expressed as θ_a, θ_b, θ_c, θ_d, and θ_e, respectively. As illustrated in FIG. 5, the stationary object closer to radar apparatus 10 has larger estimation angle θ and smaller cos θ. As a result, for example, as represented by Expressions 1 and 2, the stationary object closer to radar apparatus 10 has lower Doppler frequency detected in radar apparatus 10.

Figure 6:
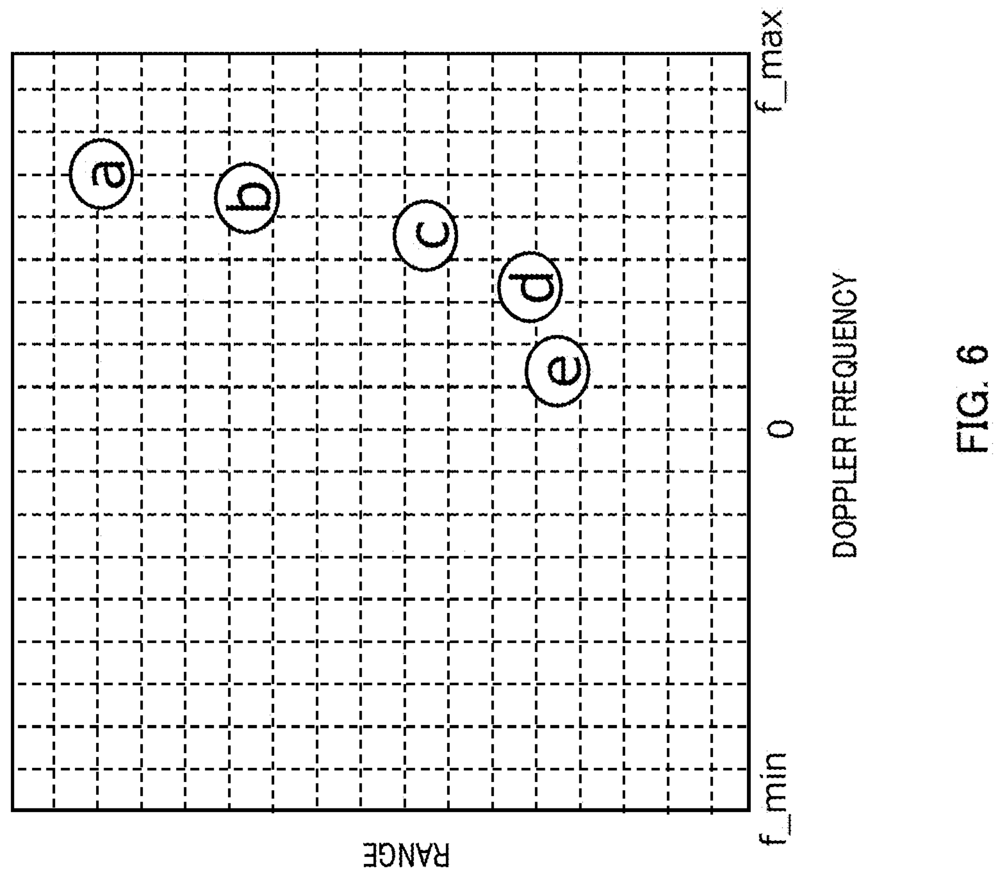
FIG. 6 illustrates an exemplary range-Doppler frequency map when a vehicle is traveling.

FIG. 6 illustrates an example in which the state in FIG. 5 is plotted on a range-Doppler frequency map. The range-Doppler frequency map illustrated in FIG. 6 is generated by obtaining the power sum at the output of VFFT 308 of the respective reception antenna systems and extracting the range bin and Doppler frequency bin exceeding a predetermined threshold by CFAR 309.

For example, when a vehicle on which radar apparatus 10 is mounted travels at a predetermined speed, the distribution of the stationary objects in FIG. 6 may vary and is not uniformly determined due to the velocity of the vehicle or positional relationships between the vehicle and the stationary objects. It is thus difficult to determine whether the reflection object detected by radar apparatus 10 is a stationary object or a moving object.

Figure 7:
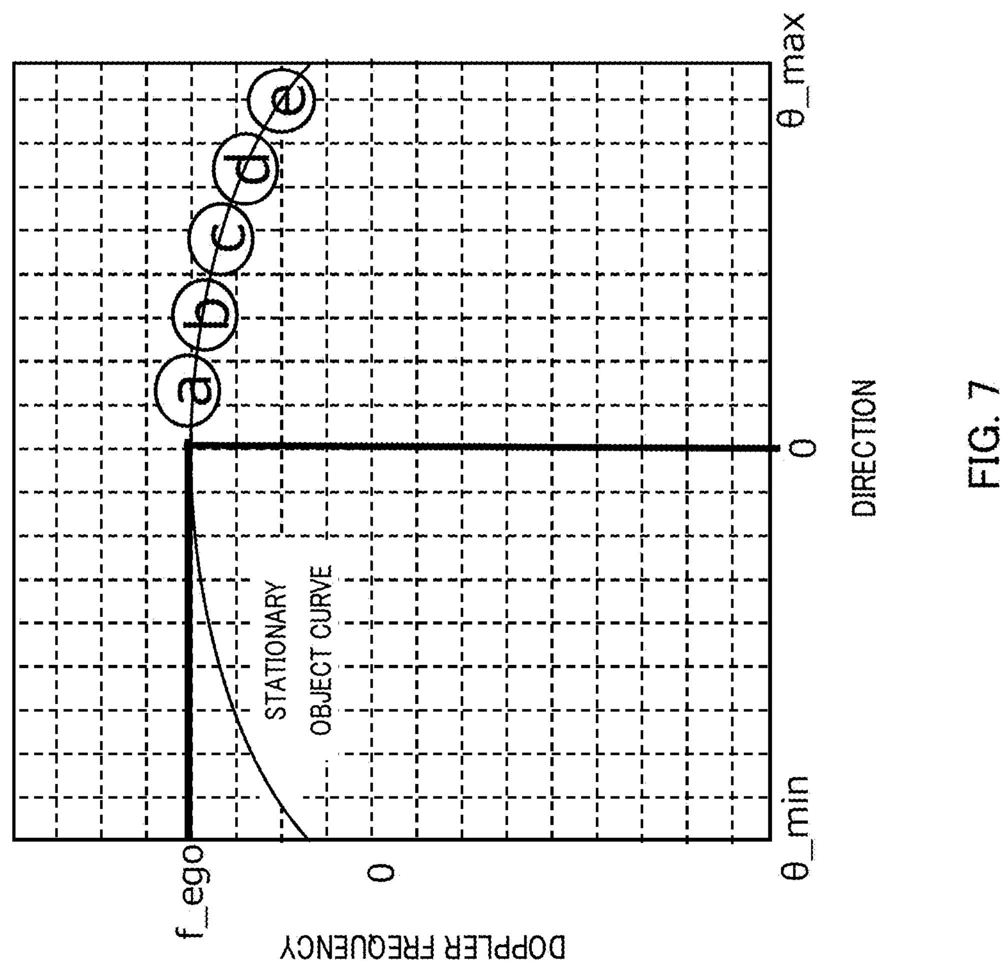
FIG. 7 illustrates an exemplary Doppler frequency-direction map when a vehicle is traveling.

With this regard, radar apparatus 10 generates a Doppler frequency-direction map as illustrated in FIG. 7 by utilizing the output of DOA estimator 310. For example, the Doppler frequency observed in radar apparatus 10 is independent of the range and depends on the angle (e.g., direction) at which a reflection object is located, so that a stationary object curve as illustrated in FIG. 7 can be drawn. Here, the maximum value of the Doppler velocity (e.g., Doppler frequency) is observed when a stationary object is present in the traveling direction of the vehicle, and the Doppler frequency in this case is expressed as "f_ego".

Since the stationary object curve is determined in one position when the velocity of the vehicle is fixed, for example, the determination of whether the point cloud detected by radar apparatus 10 is a stationary object or a moving object can be performed in terms of whether it is plotted on the stationary object curve.

However, the Doppler velocity is difficult to be extracted for an object moving in a direction perpendicular to the traveling direction of the vehicle, so-called the cross-range direction, and thus it is also preferable that radar apparatus 10 performs the determination of the stationary object/moving object by combining the above determination based on the stationary object curve and other processing such as tracking.

Next, a case where a vehicle on which radar apparatus 10 is mounted is stopped will be described.

Figure 8:
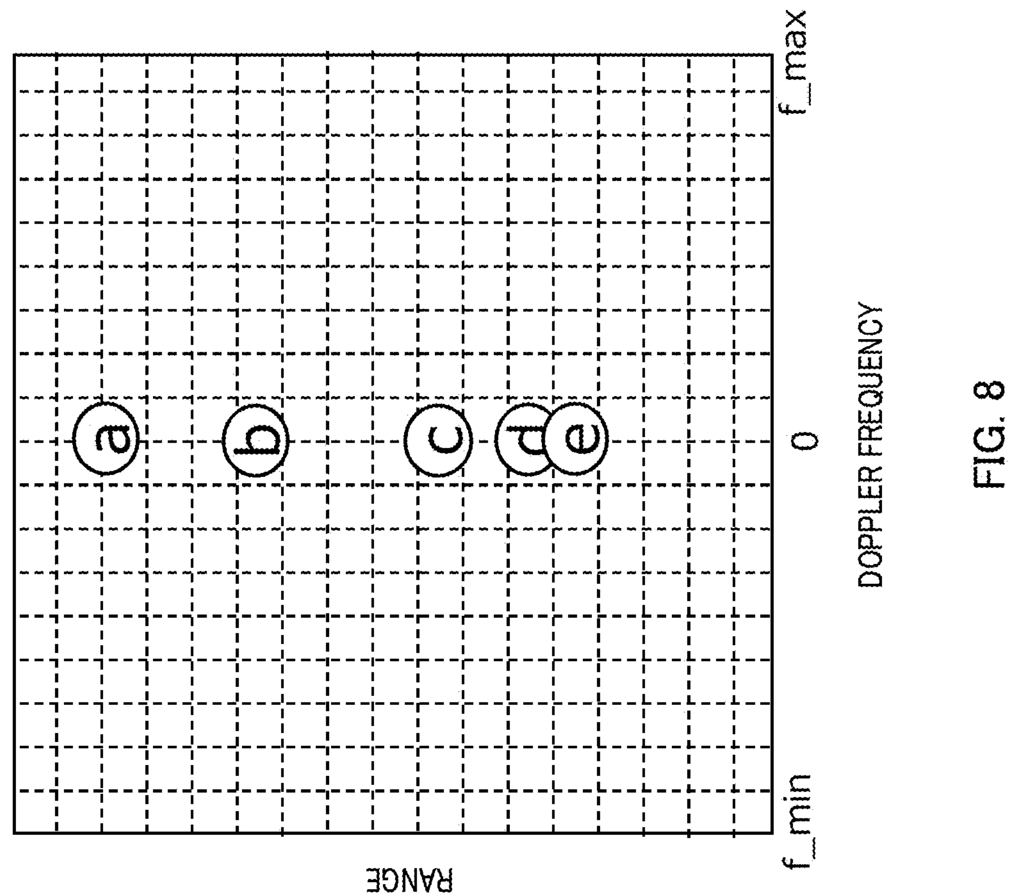
FIG. 8 illustrates an exemplary range-Doppler frequency map when a vehicle is stopped.

For example, FIG. 8 illustrates an exemplary range-Doppler frequency map when the stationary objects are present in the same positions as those in FIG. 4 and the vehicle is stopped. As illustrated in FIG. 8, when the vehicle is stopped, the stationary objects are all plotted on the straight line with zero Doppler frequency.

Thus, when a plurality of reflection objects are located at the same range in different directions, for example, radar apparatus 10 cannot obtain the Doppler frequency-based separation effect, and the resolution is deteriorated, making it difficult to estimate the shape of the object.

Figure 9:
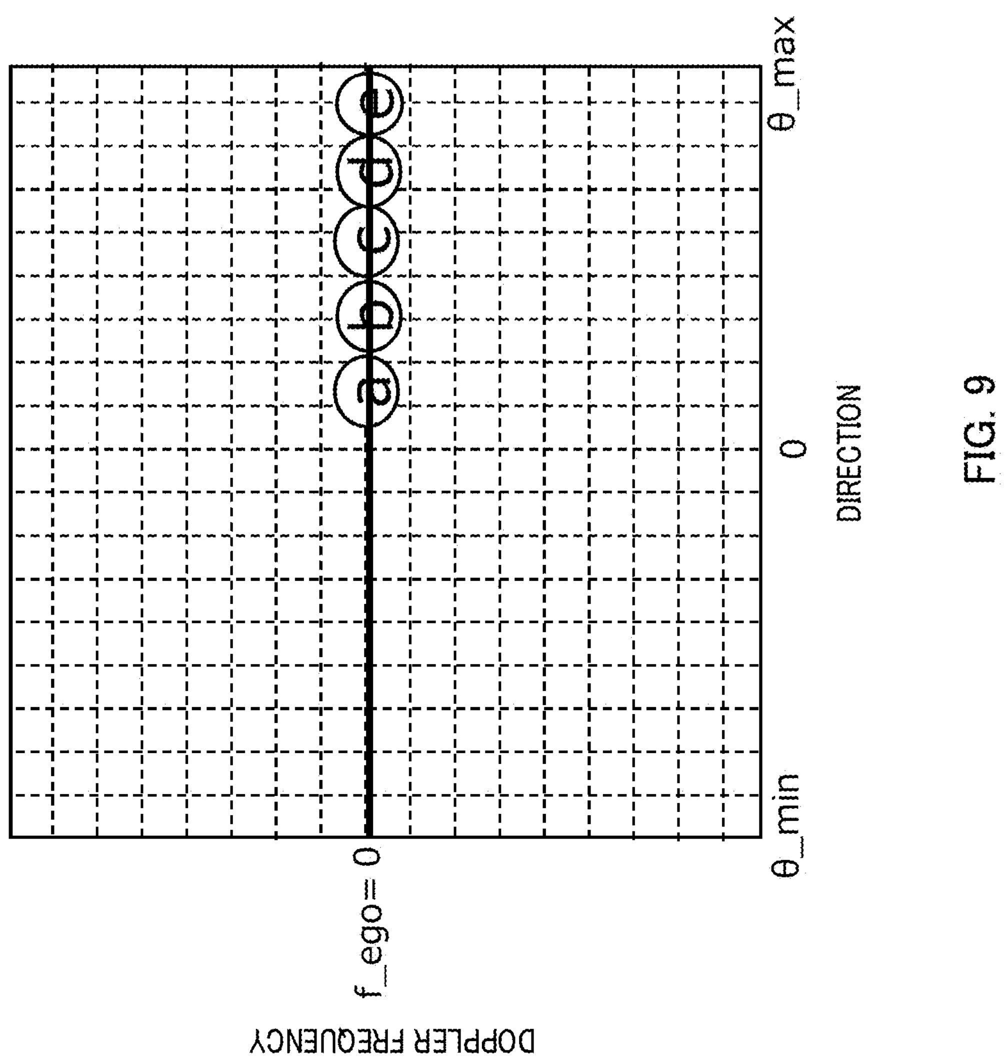
FIG. 9 illustrates an exemplary Doppler frequency-direction map when a vehicle is stopped.

Note that, when the vehicle is stopped, the objects are all plotted on the straight line with zero frequency on the range-Doppler frequency map as illustrated in FIG. 9.

Thus, in the present embodiment, radar apparatus 10 introduces a mechanism in which the point cloud data of a past frame obtained before the vehicle equipped with radar apparatus 10 is stopped is superimposed on the point cloud data of the latest frame obtained after the vehicle is stopped.

Figure 10:
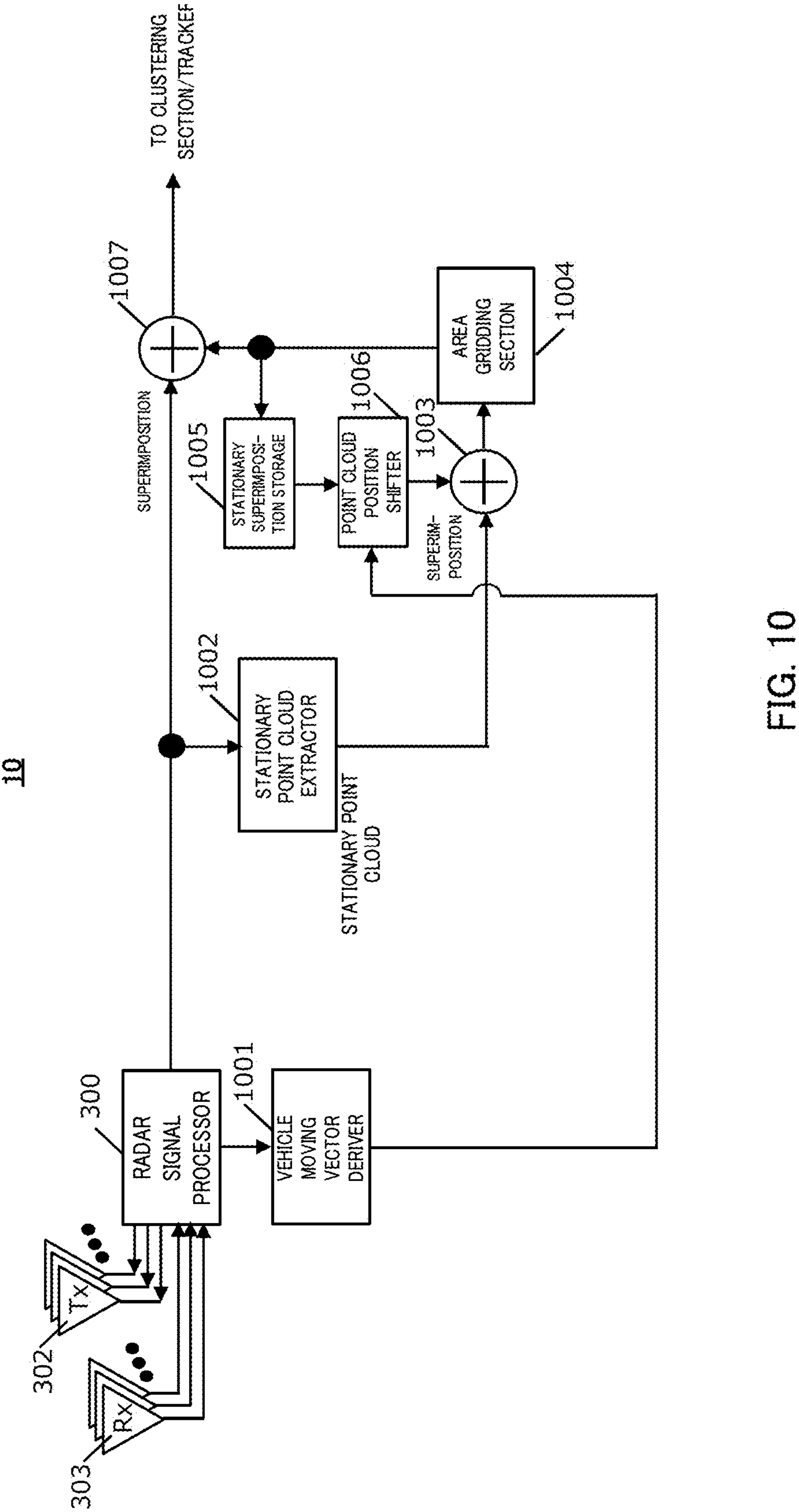
FIG. 10 illustrates an exemplary block configuration of a radar apparatus according to Embodiment 1.

FIG. 10 is a block diagram illustrating an exemplary configuration of radar apparatus 10 according to the present embodiment.

Radar apparatus 10 illustrated in FIG. 10 includes vehicle moving vector deriver 1001, stationary point cloud extractor 1002, superimposing section 1003, area gridding section 1004, stationary superimposition storage 1005, point cloud position shifter 1006, and superimposing section 1007 in addition to radar signal processor 300, transmission antenna 302 composed of a plurality of arrays, and reception antenna 303 composed of a plurality of arrays illustrated in FIG. 3.

Vehicle moving vector deriver 1001 derives information on a moving vector (e.g., moving vector amount) such as a moving direction and velocity of the vehicle.

Stationary point cloud extractor 1002 extracts a point cloud corresponding to a stationary object (hereinafter referred to as a “stationary object point cloud” or “stationary point cloud”) from the point cloud data inputted from radar signal processor 300. For example, stationary point cloud extractor 1002 extracts a stationary point cloud such as a point cloud on the stationary object curve on the Doppler frequency-direction map.

Point cloud position shifter 1006 shifts a position of the stationary point cloud obtained in the past frame stored in stationary superimposition storage 1005 to a position that can be detected in the latest frame, based on the information on the moving vector inputted from vehicle moving vector deriver 1001.

Superimposing section 1003 superimposes the output point cloud from point cloud position shifter 1006 on the point cloud outputted from stationary point cloud extractor 1002.

Area gridding section 1004 quantizes the output from superimposing section 1003. For example, area gridding section 1004 may quantize the stationary point cloud into a plurality of areas obtained by dividing the detection target area of radar apparatus 10. For example, area gridding section 1004 determines whether a point cloud is stored in stationary superimposition storage 1005 for each of the gridded areas of the detection target area. Area gridding section 1004 then outputs (or adds) the point cloud in the area with no point cloud stored to stationary superimposition storage 1005, and does not output (or add) the point cloud in the area with the point cloud stored to stationary superimposition storage 1005. Such gridding of the detection target area allows stationary superimposition storage 1005 to store one (or a prescribed number of) point cloud(s) for each of the plurality of areas of the detection target area, for example. This reduces the data capacity for holding the point clouds of the past frame.

Stationary superimposition storage 1005 holds the output data from area gridding section 1004.

Superimposing section 1007 superimposes the stationary object point cloud detected in the past frame and all the point clouds including a moving object point cloud detected in the latest frame (e.g., current frame).

As described above, in radar apparatus 10, stationary point cloud extractor 1002 may extract the stationary point clouds in a plurality of frames (e.g., a plurality of past frames corresponding to the latest frame), point cloud position shifter 1006 may shift the position of the stationary point cloud extracted in each of the plurality of past frames based on the moving vector of the vehicle, and superimposing section 1003 may superimpose the plurality of position-shifted stationary point clouds extracted in the plurality of past frames. For example, point cloud position shifter 1006 may shift the position of the point cloud so as to compensate for the amount of movement from the previous frame obtained by vehicle movement vector deriver 1001.

Figure 11:
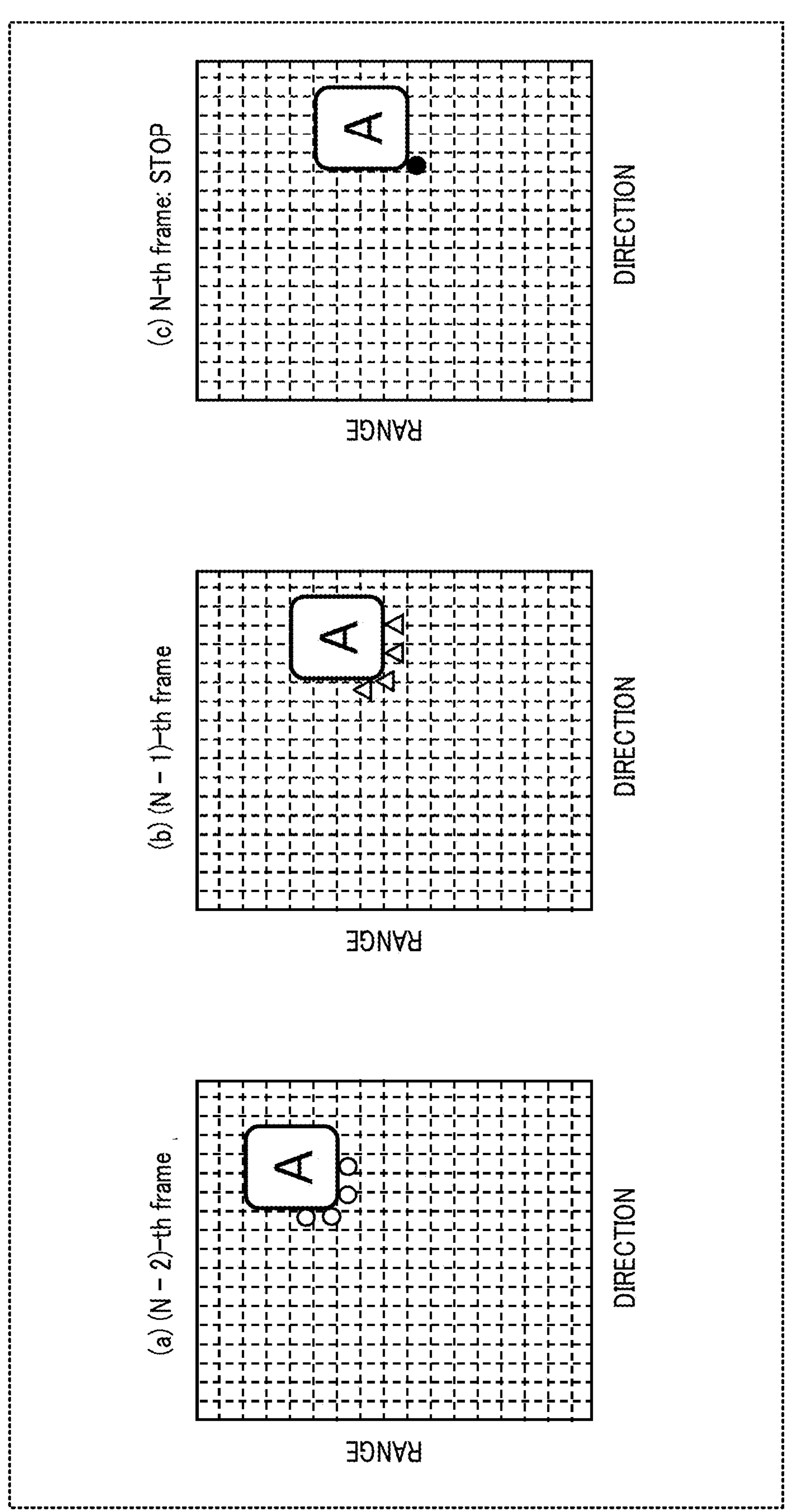
FIG. 11 is exemplary range-direction maps illustrating the timings of frames and detection results according to Embodiment 1.

For example, (a) to (c) of FIG. 11 illustrate an example of the positions and detected point clouds of stationary object (reflection object) A in the latest frame, which is the N-th frame, and the past two frames. For example, the point cloud detected in the (N−2)-th frame is represented by the signs ○ as illustrated in (a) of FIG. 11, the point cloud detected in the (N−1)-th frame is represented by signs Δ as illustrated in (b) of FIG. 11, and the point cloud detected in the N-th frame is represented by signs ● as illustrated in (c) of FIG. 11.

Note that, assuming that the vehicle is stopped in the latest N-th frame, (c) of FIG. 11 also illustrates a decreased number of detected point clouds due to the stopping of the vehicle.

Figure 12:
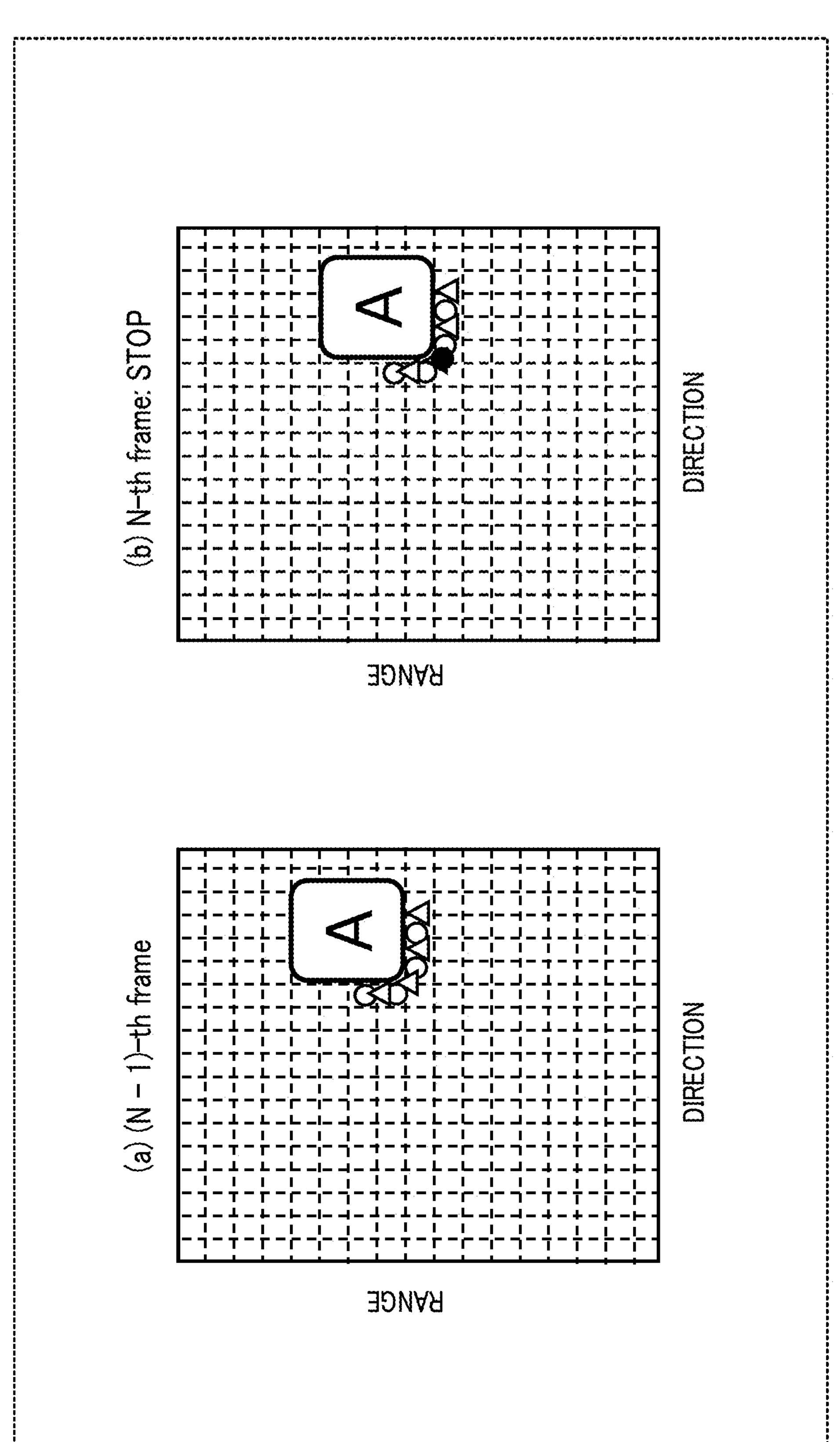
FIG. 12 is exemplary range-direction maps illustrating superimposition results at the respective timings of the frames according to Embodiment 1.

FIG. 12 illustrates exemplary point clouds at the output points of superimposing section 1003.

As illustrated in (a) of FIG. 12, at the timing of the (N−1)-th frame, point clouds up to the previous frame ((N−2)-th frame) are stored in stationary superimposition storage 1005. For example, point cloud position shifter 1006 performs compensation based on the moving vector amount of the vehicle for the output from stationary superimposition storage 1005, and superimposing section 1003 superimposes the compensated stationary point cloud on the output from stationary point cloud extractor 1002 (e.g., point cloud detected in the (N−1)-th frame).

By this processing, the point cloud of signs ○ detected in the (N−2)-th frame is added to the point cloud of signs Δ detected in the (N−1)-th frame at the output point of superimposing section 1003 as illustrated in (a) of FIG. 12, resulting in the point cloud data with high point cloud density compared with the case of (b) of FIG. 11. In (a) of FIG. 12, the point cloud of signs ○ detected in the (N−2)-th frame is shifted to the position (e.g., position of stationary object A in the (N−1)-th frame) according to the movement of the vehicle (e.g., moving vector amount) from the (N−2)-th frame to the (N−1)-th frame.

As illustrated in (b) of FIG. 12, it is possible to obtain the point cloud data with high point cloud density in the next N-th frame as well.

As described above, radar apparatus 10 superimposes the point cloud data of the latest frame (e.g., including the point clouds corresponding to a moving object and a stationary object) and the stationary point cloud of the past frame. Thus, even when a vehicle equipped with radar apparatus 10 is stopped and it is difficult to detect the point cloud corresponding to a stationary object in the current frame, for example, radar apparatus 10 can appropriately specify the stationary object based on the point cloud data obtained in the past frame, thereby reducing deterioration of the resolution and improving estimation accuracy for the shape of an object.

Figure 13:
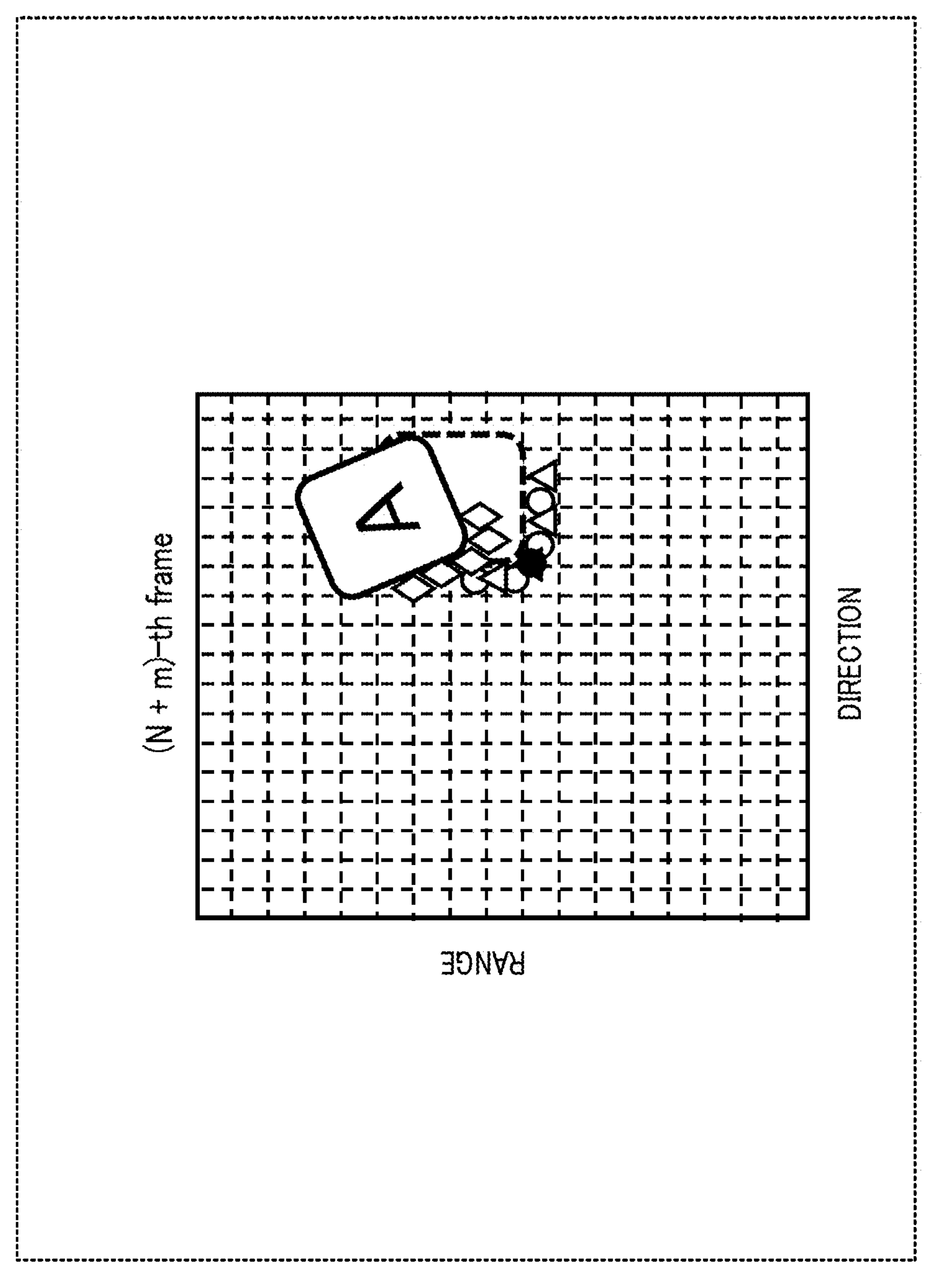
FIG. 13 is an exemplary range-direction map at the time when a stopped vehicle starts traveling according to Embodiment 1.

When stationary object A detected in the latest N-th frame remains stationary until the vehicle equipped with radar apparatus 10 travels again, the shape of the object can be estimated by the configuration and operation of radar apparatus 10 illustrated in FIG. 10. When stationary object A has moved while the vehicle is stopped, however, the following should be considered. For example, as illustrated in FIG. 13, when the state of stationary object A changes from stationary to moving at the timing of the (N+m)-th frame, the point cloud of signs ◇ is detected in the latest (N+m)-th frame, and in addition to that, the point clouds of signs ○, signs Δ, and signs ● detected in the past frames may be outputted as if the point clouds are still present.

Figure 14:
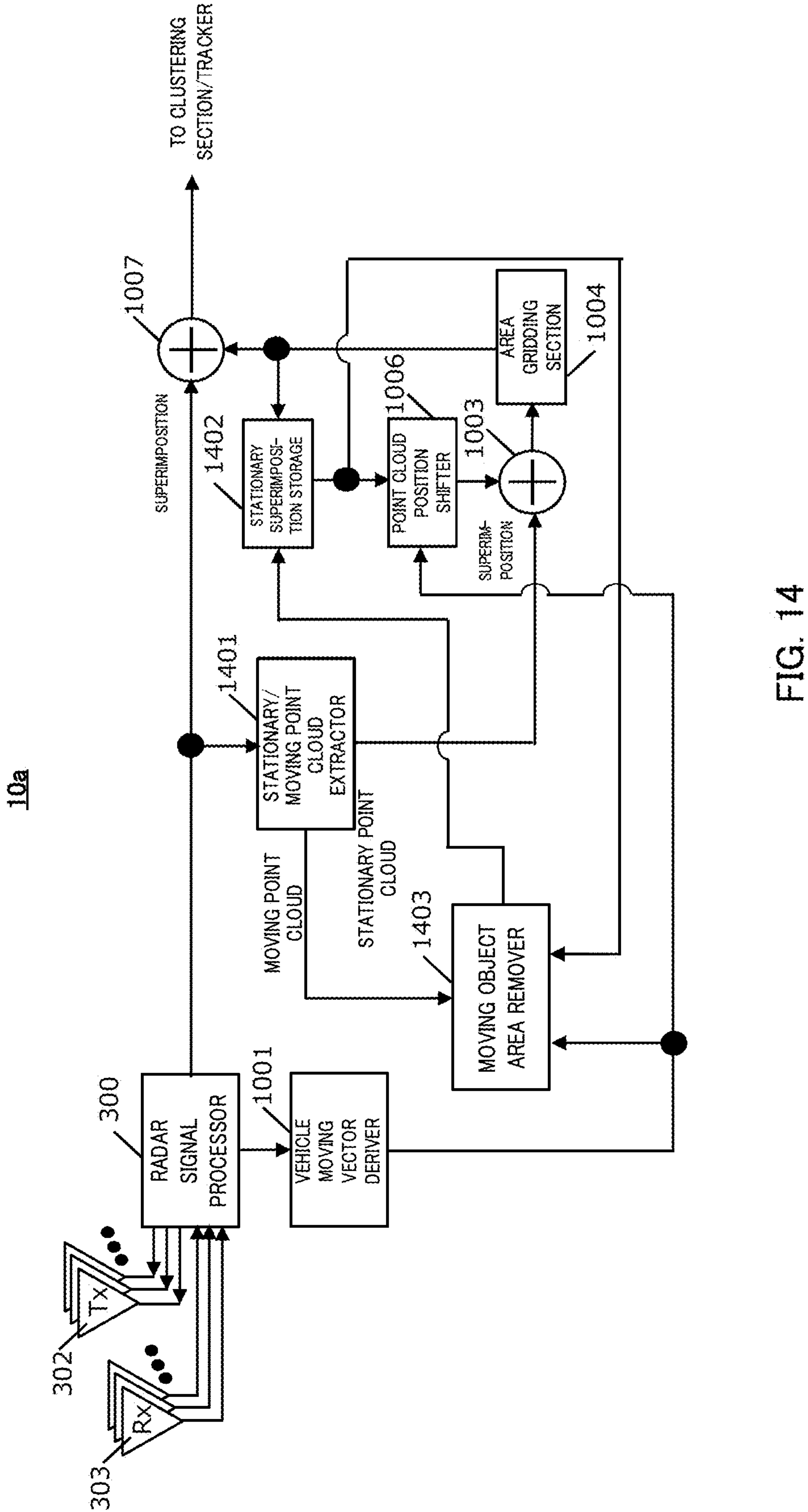
FIG. 14 illustrates an exemplary block configuration of the radar apparatus according to Embodiment 1.

Thus, radar apparatus 10*a* illustrated in FIG. 14 may be configured in the present embodiment.

Radar apparatus 10*a* illustrated in FIG. 14 has a configuration in which stationary point cloud extractor 1002 in radar apparatus 100 illustrated in FIG. 10 is replaced with stationary/moving point cloud extractor 1401, stationary superimposition storage 1005 is replaced with stationary superimposition storage 1402 with a partial area removal function, and moving object area remover 1403 is added.

Stationary/moving point cloud extractor 1401 extracts a moving point cloud in addition to a stationary point cloud from the point cloud data inputted from radar signal processor 300.

Stationary superimposition storage 1402 holds the output data from area gridding section 1004 (data of the stationary point cloud). In addition, at least a part of the data of the stationary point cloud held in stationary superimposition storage 1402 may be removed by moving object area remover 1403, which will be described below.

For example, moving object area remover 1403 determines whether to remove a stationary point cloud stored in stationary superimposition storage 1402 based on the positions of the stationary point cloud and the moving point cloud.

For example, moving object area remover 1403 determines whether a vehicle on which radar apparatus 10 is mounted is stopped or whether the moving vector of the vehicle is zero based on information on the moving vector inputted from vehicle moving vector deriver 1001. Then, under the condition that the vehicle on which radar apparatus 10 is mounted is stopped and the vehicle moving vector is zero, when a moving point cloud is outputted from stationary/moving point cloud extractor 1401, moving object area remover 1403 determines whether the position of the moving point cloud corresponds to the position previously detected as a stationary point cloud in the past frame and stored in stationary superimposition storage 1402. Moving object area remover 1403 does not perform processing when the position of the moving point cloud does not correspond to the position detected as a stationary point cloud. Meanwhile, when the position of the moving point cloud corresponds to the position detected as the stationary point cloud, moving object area remover 1403 performs removing processing of partially removing a point cloud in the position among the point clouds stored in stationary superimposition storage 1402.

Note that an exemplary situation where the position of the moving point cloud corresponds to the position detected as a stationary point cloud is a situation where a vehicle stopped in front of the self-vehicle starts traveling.

Figure 15:
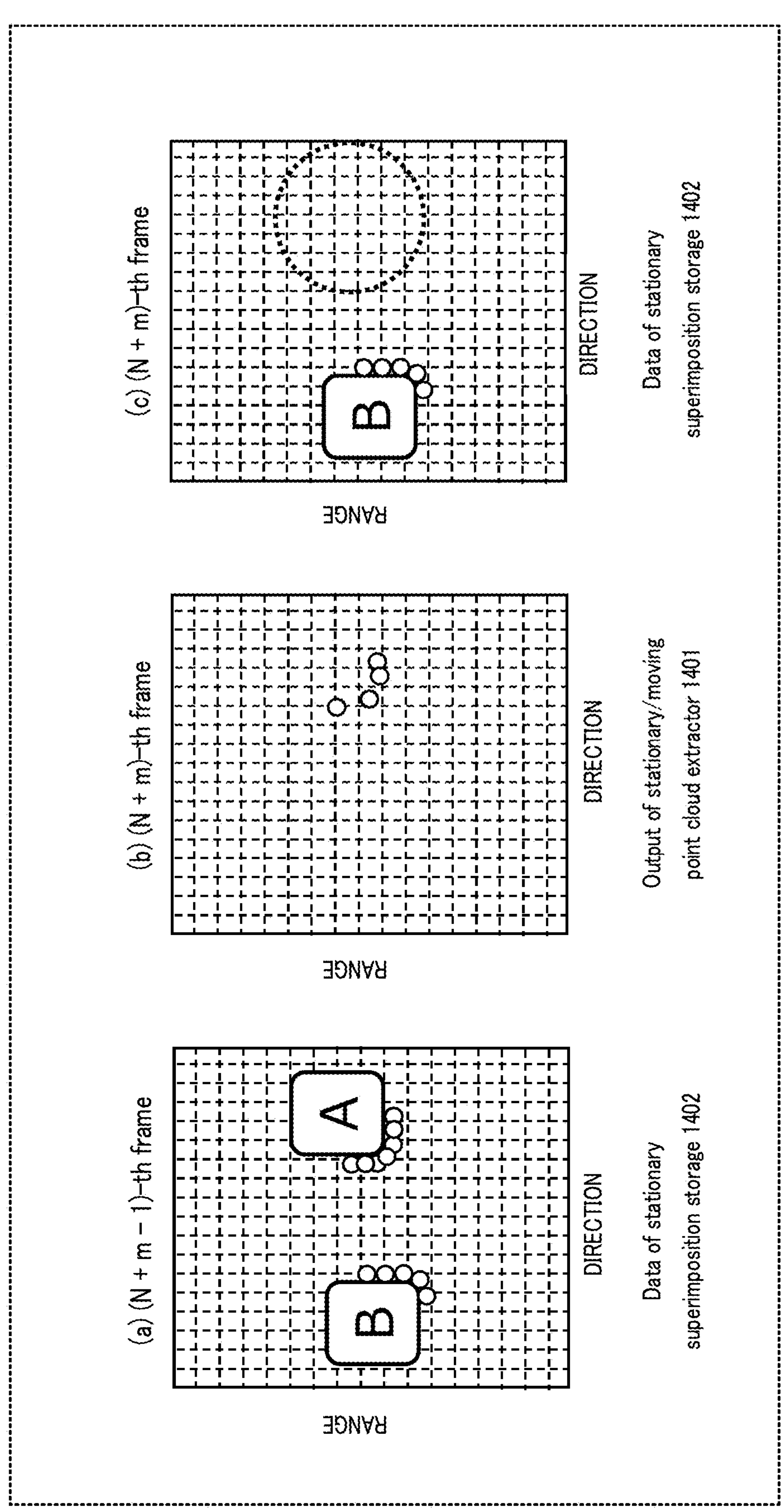
FIG. 15 illustrates processing contents of the radar apparatus according to Embodiment 1.

By way of example, (a) of FIG. 15 illustrates an exemplary range-direction map of a point cloud stored in stationary superimposition storage 1402 at the timing of the (N+m−1)-th frame. As illustrated in (a) of FIG. 15, a stationary point cloud corresponding to stationary object A and a stationary point cloud corresponding to stationary object B are stored in stationary superimposition storage 1402.

In addition, (b) of FIG. 15 illustrates an exemplary moving point cloud outputted from stationary/moving point cloud extractor 1401 at the timing of the (N+m)-th frame.

In (b) of FIG. 15, the position of the moving point cloud extracted by stationary/moving point cloud extractor 1401 corresponds to the position of the point cloud corresponding to stationary object A stored in stationary superimposition storage 1402, and thus moving object area remover 1403 determines that stationary object A in (a) of FIG. 15 has moved (or started moving). For example, as illustrated in (c) of FIG. 15, moving object area remover 1403 removes (clears) the point cloud data present in an area (surrounded by the dotted circle) corresponding to the position of the moving point cloud (or position corresponding to stationary object A) among the stationary point clouds stored in stationary superimposition storage 1402.

Note that, in the output of superimposing section 1007 outputted to a clustering section/tracker (not illustrated), all point clouds detected in the (N+m)-th frame in addition to the output (e.g., stationary point cloud) from stationary superimposition storage 1402 are superimposed, and thus an updated accurate detection state is outputted even when a point cloud is partially removed from stationary superimposition storage 1402.

By the processing of radar apparatus 10*a* (removal of a stationary point cloud), radar apparatus 10*a* can prevent the output in the latest frame of a result with a point cloud detected in the past frame even when stationary object A moves while a vehicle equipped with radar apparatus 10*a* is stopped. This allows radar apparatus 10*a* to appropriately specify the stationary object, thereby reducing deterioration of the resolution and improving estimation accuracy for the shape of an object.

It is also assumed that a vehicle with radar apparatus 10 equipped and stationary object A move almost at the same time. An exemplary case is where a plurality of vehicles stopped at a red light start traveling again almost at the same time. Also in this case, the stationary point clouds when stationary objects A are stopped may be removed. Thus, the condition is not limited to the case where a vehicle equipped with radar apparatus 10 is stopped, and may also include the case where the vehicle starts traveling again.

For example, a Doppler frequency shift occurs when the reflection object moves closer to radar apparatus 10*b* or farther away from the radar apparatus while a vehicle equipped with the radar apparatus is stopped, so that the radar apparatus can accurately distinguish between a moving object and a stationary object. In contrast, a Doppler frequency shift is unlikely to occur when the reflection object moves in a so-called cross-range direction, which is a direction crossing the center of the detection target area of the radar apparatus, so that the reflection object is highly likely to be accidentally determined in the radar apparatus as a stationary object although it is a moving object.

Next, a method of extracting a stationary point cloud and a moving point cloud with higher accuracy will be described.

Figure 16:
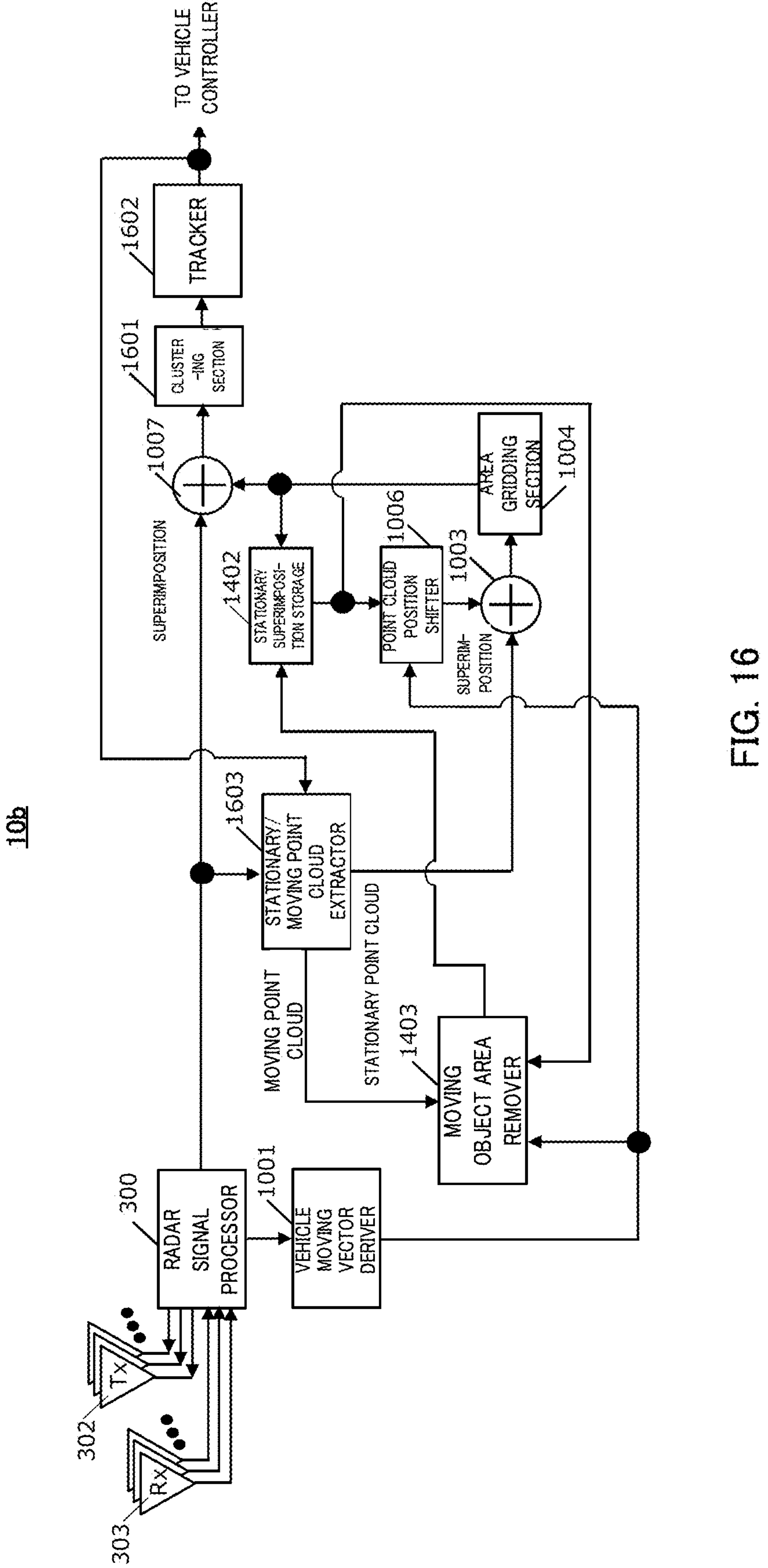
FIG. 16 illustrates another exemplary block configuration of the radar apparatus according to Embodiment 1.

FIG. 16 illustrates an exemplary configuration of radar apparatus 10*b* for extracting a stationary point cloud and a moving point cloud with higher accuracy.

Radar apparatus 10*b* illustrated in FIG. 16 has a configuration in which stationary/moving point cloud extractor 1401 in radar apparatus 10*a* illustrated in FIG. 14 is replaced with stationary/moving point cloud extractor 1603, and clustering section 1601 and tracker 1602 are further added.

For example, clustering section 1601 regionalizes (or makes a cluster of) a plurality of point clouds satisfying a predetermined condition based on the point cloud data outputted from superimposing section 1007, and generates a single cluster for each object. From the clustering, it is assumed that the plurality of point clouds are a plurality of reflection points from a single object.

For example, tracker 1602 estimates (tracks) a true position by reducing an effect of noises or clutters according to past moving vectors of each cluster and the position detected in the latest frame, based on information on clusters outputted from clustering section 1601.

Stationary/moving point cloud extractor 1603 determines whether each point cloud in the point cloud data inputted from radar signal processor 300 is a stationary point cloud or a moving point cloud, for example, by using a tracking result of tracker 1602. For example, when the Doppler velocity is zero or close to zero, stationary/moving point cloud extractor 1603 may determine whether the detected point cloud corresponds to a point cloud tracked as a moving object by tracker 1602 and then determine whether the detected point cloud corresponds to a stationary object or a moving object.

The configuration of radar apparatus 10*b* illustrated in FIG. 16 enables accurate distinction between a moving object and a stationary object and the determination even when a Doppler frequency shift is less likely to occur, for example, thereby improving accuracy of extracting a stationary point cloud and a moving point cloud.

Embodiment 2

Figure 17:
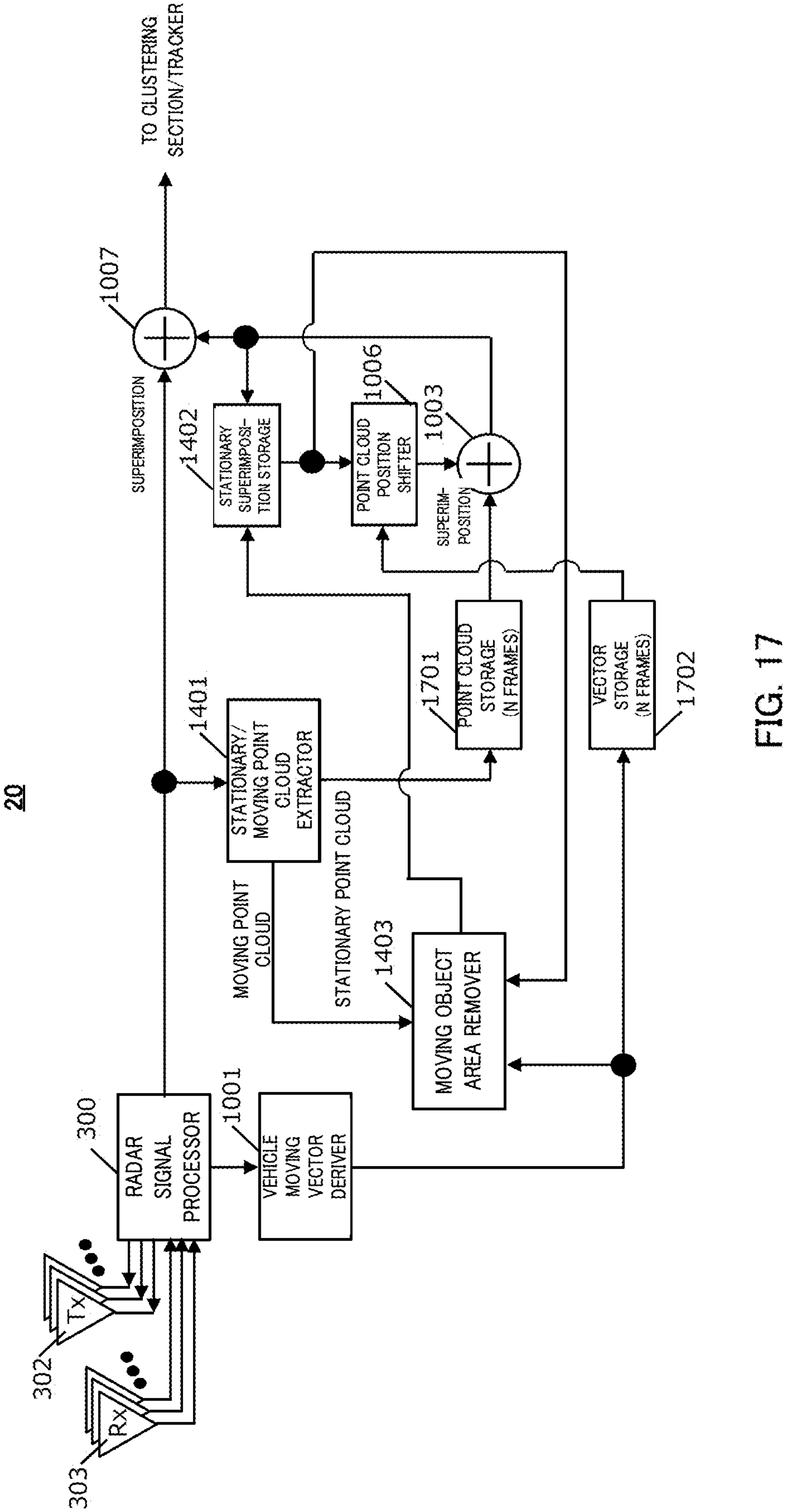
FIG. 17 illustrates an exemplary block configuration of the radar apparatus according to Embodiment 2.

FIG. 17 is a block diagram illustrating an exemplary configuration of radar apparatus 20 according to the present embodiment.

Radar apparatus 20 illustrated in FIG. 17 has a configuration in which area gridding section 1004 is eliminated from the configuration of radar apparatus 10*a* illustrated in FIG. 14 and point cloud storage 1701 and vector storage 1702 are added.

Point cloud storage 1701 stores, for example, point clouds for N frames outputted from stationary/moving point cloud extractor 1401. Vector storage 1702 stores, for example, vehicle moving vectors for N frames outputted from vehicle moving vector deriver 1001. For example, point cloud storage 1701 and vector storage 1702 may correspond to storage circuitry that stores stationary point clouds over N frames and vehicle moving vectors over N frames.

For example, each time the latest frame is obtained, radar apparatus 20 performs processing of superimposing the point cloud data detected over the past N frames while compensating for the vector movement of a vehicle.

In the present embodiment, quantization in area gridding section 1004 as in Embodiment 1 is not performed, and it is thus possible to generate a stationary point cloud with higher accuracy. This allows radar apparatus 30 to appropriately specify the stationary object from the point cloud data obtained in frames, thereby reducing deterioration of the resolution and improving estimation accuracy for the shape of an object.

It is difficult to hold all the past point clouds due to the storage capacity, and thus the number of frames stored in point cloud storage 1701 and vector storage 1702 is set (or limited) to N.

Figure 18:
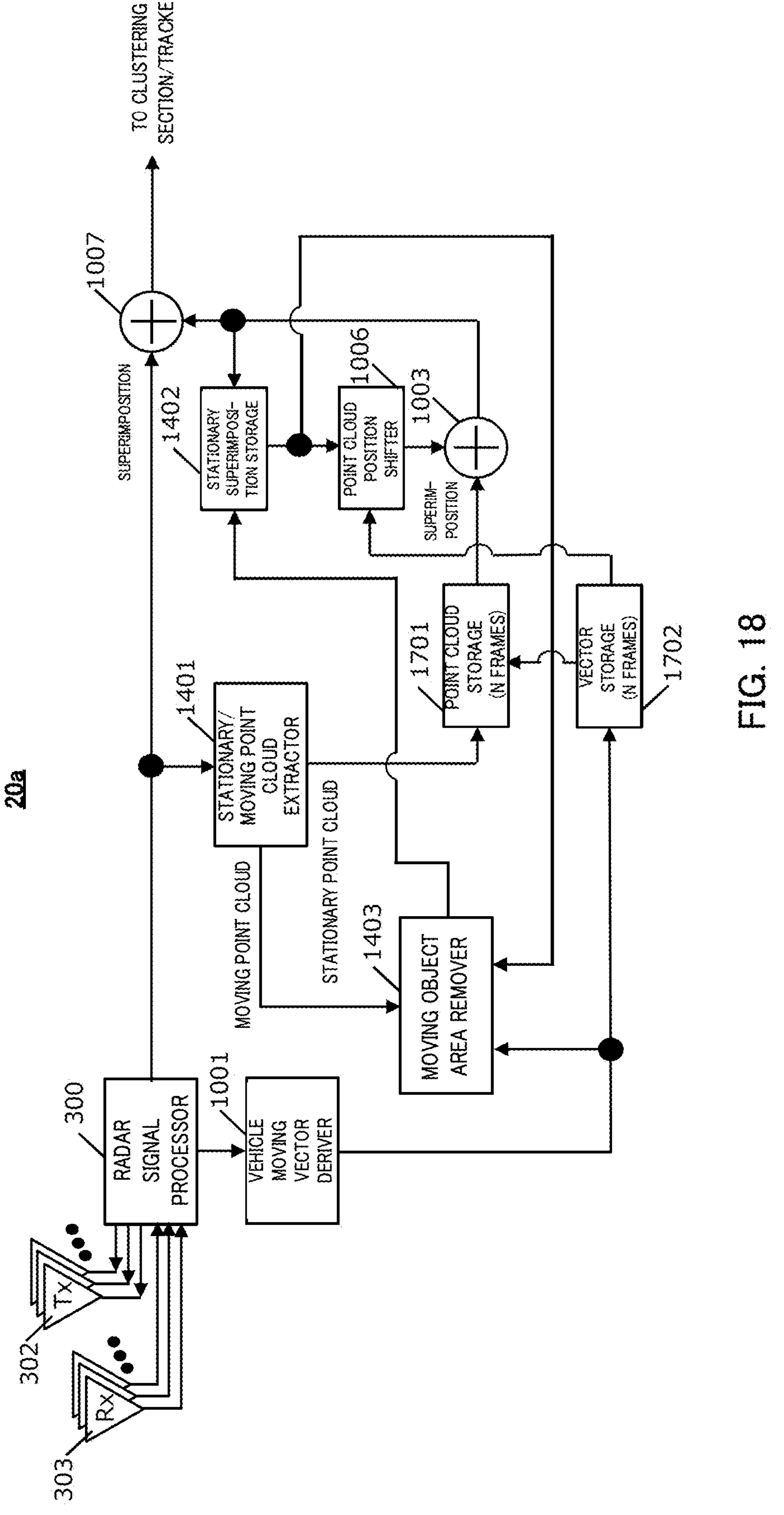
FIG. 18 illustrates another exemplary block configuration of the radar apparatus according to Embodiment 2.

When a vehicle equipped with radar apparatus 20 stops for a long time, or when the vehicle repeats stopping and traveling slowly, older point cloud data with high density obtained during the vehicle movement is possibly lost since the number of frames to be stored is set (or limited) to N. Thus, the radar apparatus may have a configuration of storing the point cloud data and moving vector when the vehicle equipped with radar apparatus 20*a* is traveling and not storing (rejecting) the data when the vehicle is stopped on the basis of moving vectors outputted from vehicle moving vector deriver 1001, for example, as in radar apparatus 20*a* illustrated in FIG. 18. Note that the same frame is set in point cloud storage 1701 and vector storage 1702 for a frame not stored (rejected) in radar apparatus 20*a* illustrated in FIG. 18.

Figure 19:
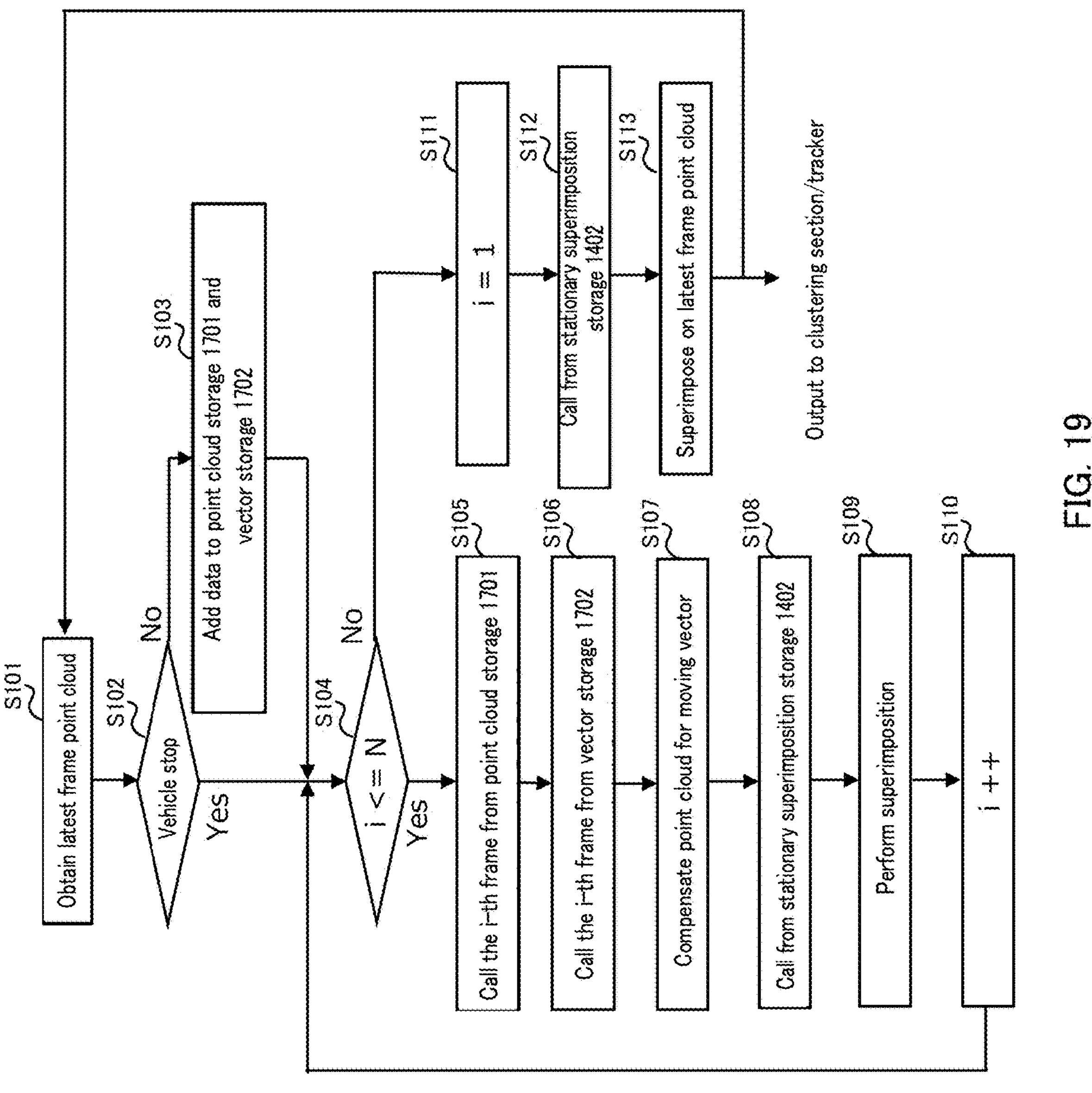
FIG. 19 illustrates an exemplary processing procedure of the radar apparatus according to Embodiment 2.

FIG. 19 is a flowchart illustrating an exemplary operation of radar apparatus 20*a* according to the present embodiment. Note that the initial value of variable i may be set to 1 in FIG. 19.

In FIG. 19, radar apparatus 20*a* obtains a point cloud of the current frame (S101).

After obtaining the point cloud of the current frame, radar apparatus 20*a* determines whether a vehicle equipped with radar apparatus 20*a* is stopped (S102). When the vehicle is moving (or not stopped) (No in S102), radar apparatus 20*a* adds the detected point cloud data to point cloud storage 1701 and adds data related to the moving vector to vector storage 1702 (S103). Meanwhile, when the vehicle is stopped (Yes in S102), radar apparatus 20*a* does not store (or rejects) the point cloud data and the data related to the moving vector detected in the frame.

Then, radar apparatus 20*a* repeats processing of superimposing the point clouds for N frames stored in point cloud storage 1701N times while performing the vehicle moving vector compensation in the corresponding frames (S104 to S110).

When N times of the processing is complete (No in S104), radar apparatus 20*a* superimposes the generated stationary point cloud superimposition result on the latest frame point cloud (S111 to S113).

By the processing of radar apparatus 20*a*, the point cloud data with high density obtained during the vehicle movement is less likely to be lost in the N frames whose point cloud data is stored even when the vehicle equipped with radar apparatus 20 is stopped for a long time or the vehicle repeats stopping and traveling slowly, thereby improving estimation accuracy for the shape of an object.

Note that the number N of frames may be a fixed value or a variable value. For example, the value of N may be variably set according to the velocity of a vehicle. The N frames may be consecutive frames or discontinuous frames.

In the present embodiment, radar apparatus 20*a* determines whether a vehicle is stopped, but the present disclosure is not limited thereto, and for example, radar apparatus 20*a* may determine whether the moving velocity of a vehicle is equal to or less than a threshold.

Embodiment 3

Figure 20:
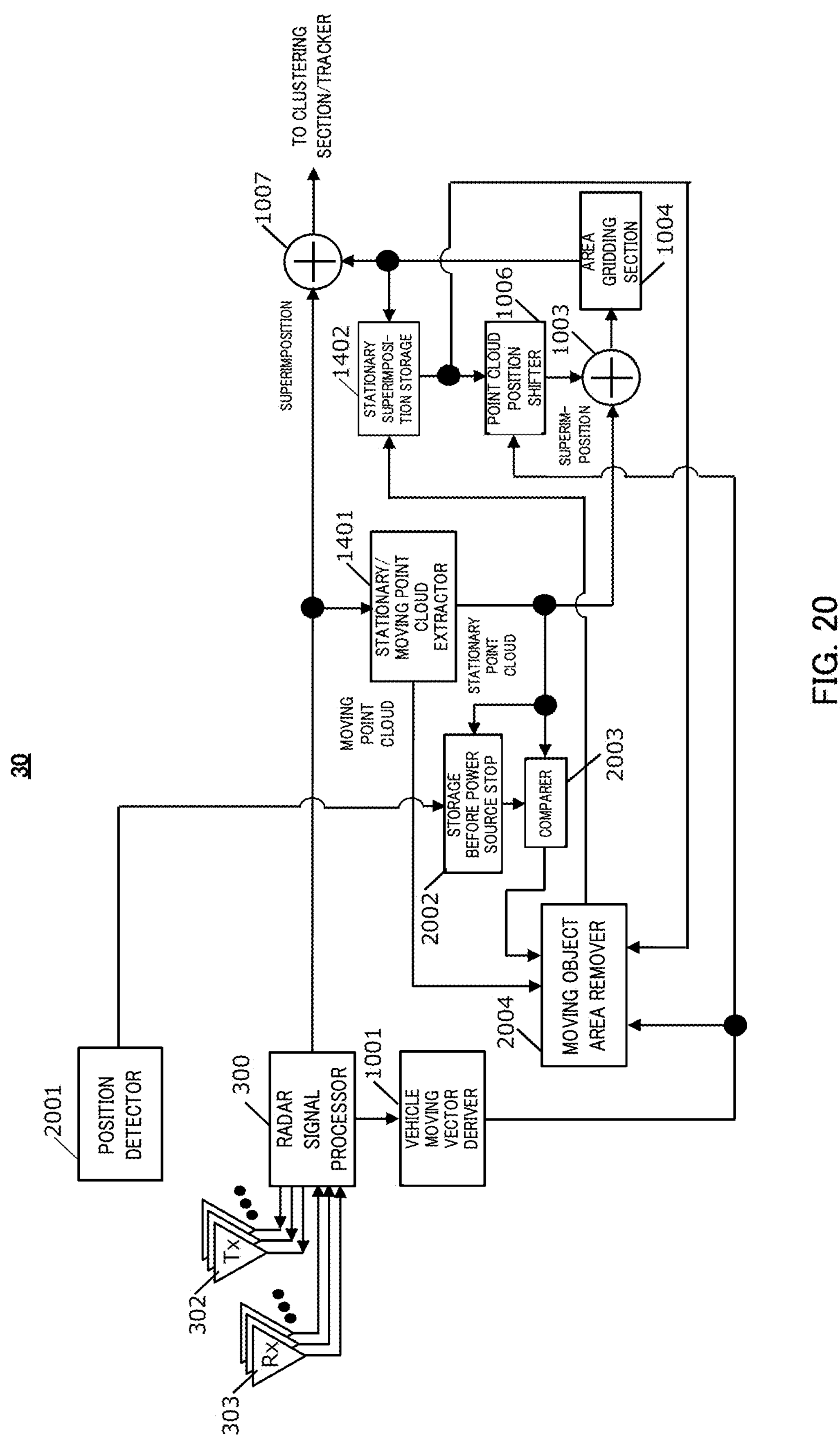
FIG. 20 illustrates an exemplary block configuration of the radar apparatus according to Embodiment 3.

FIG. 20 is a block diagram illustrating an exemplary configuration of radar apparatus 30 according to the present embodiment.

Radar apparatus 30, for example, utilizes a point cloud obtained during the past movement not only when a vehicle equipped with radar apparatus 30 is temporarily stopped at an intersection or the like but also when the vehicle parks in a parking lot or the like, stops the power source, such as an engine, starts the power source again after some time elapses, and is stopped again.

Radar apparatus 30 illustrated in FIG. 20 has a configuration in which moving object area remover 1403 is replaced with moving object area remover 2004 from the configuration of radar apparatus 10*a* illustrated in FIG. 14, and position detector 2001, storage before power source stop 2002, and comparer 2003 are added.

Position detector 2001 detects the position of a vehicle using, for example, the global navigation satellite system (GNSS). Note that the vehicle position detection is not limited to the detection by GNSS, and another method may be used.

Storage before power source stop 2002 stores a stationary object point cloud before stopping the power source of the vehicle and position information of the vehicle detected by position detector 2001.

For example, comparer 2003 compares position information of the vehicle obtained when the power source of the vehicle is restarted and position information of the vehicle before stopping the power source stored in storage before power source stop 2002. In addition, comparer 2003 compares, for example, the position of a stationary point cloud obtained from stationary/moving point cloud extractor 1401 when the power source of the vehicle is restarted and the position of a stationary point cloud obtained before stopping the power source stored in storage before power source stop 2002.

Moving object area remover 2004 has a function corresponding to removal processing at the time of the restart after the power source is stopped, in addition to the function of moving object area remover 1403.

For example, when the comparison result of the vehicle position by comparer 2003 shows “consistent”, it can be determined that the vehicle remains in the same position from the stopping of the power source of the vehicle to the restart. Meanwhile, when the comparison result of the vehicle position by comparer 2003 shows “inconsistent”, it can be determined that the vehicle has moved to another position during the period from the stopping of the power source of the vehicle to the restart, and the surrounding environment of the vehicle has been changed. When the comparison result of the vehicle position by comparer 2003 shows “inconsistent”, moving object area remover 2004 may remove (clear) the data stored in stationary superimposition storage 1402.

Even when the vehicle remains in the same position, the surrounding environment of the vehicle may have changed. Thus, for example, for an area where the comparison result in comparer 2003 of the position of the latest stationary point cloud obtained after the restart of the power source and the position of the stationary point cloud before the power source stop shows inconsistent, moving object area remover 2004 may determine that a target object determined as a stationary object has moved and may remove (clear) the data stored in stationary superimposition storage 1402.

In the situation where the vehicle equipped with radar apparatus 30 stops the power source, starts the power source again after some time elapses, and stops again, the processing of radar apparatus 30 prevents output of a result of a point cloud detected in the past frame. This allows radar apparatus 30 to appropriately specify the stationary object, thereby reducing deterioration of the resolution and improving estimation accuracy for the shape of an object.

Note that, when most of the stationary point clouds detected before the power source stop cannot be obtained after the restart of the power source, it is highly likely that occlusion has occurred such that a reflection object is newly present (e.g., stopped) very close to radar apparatus 30. In this case, it is difficult for radar apparatus 30 to utilize point cloud data obtained during the past movement. With this regard, radar apparatus 30 may determine that it is difficult to estimate the shape of a stationary object properly, and may prompt the system to start the driving in a driver assistance mode in which a driver is responsible without starting the driving in an autonomous driving mode, for example.

Embodiment 4

For example, when a vehicle on which the radar apparatus is mounted is traveling, the radar apparatus can estimate information on a moving vector such as the velocity and yaw rate of the vehicle based on information on the stationary object curve obtained by the Doppler frequency-direction map illustrated in FIG. 7 from the relationship between the Doppler frequency and direction detected by using a reflection signal from a stationary object around the vehicle. It may be difficult, however, to accurately estimate a moving vector of the vehicle from the information of the Doppler frequency-direction map because other effects such as pitching or rolling are actually included, or the vehicle does not necessarily travel at a constant velocity and also performs acceleration and deceleration.

Thus, in the present embodiment, iterative closest point (ICP) matching processing is introduced in order to estimate a moving vector of a vehicle with high accuracy. In the ICP matching processing, for example, position matching between point cloud data obtained in the previous frame and point cloud data obtained in the latest frame is realized by repeating calculation.

Figure 21:
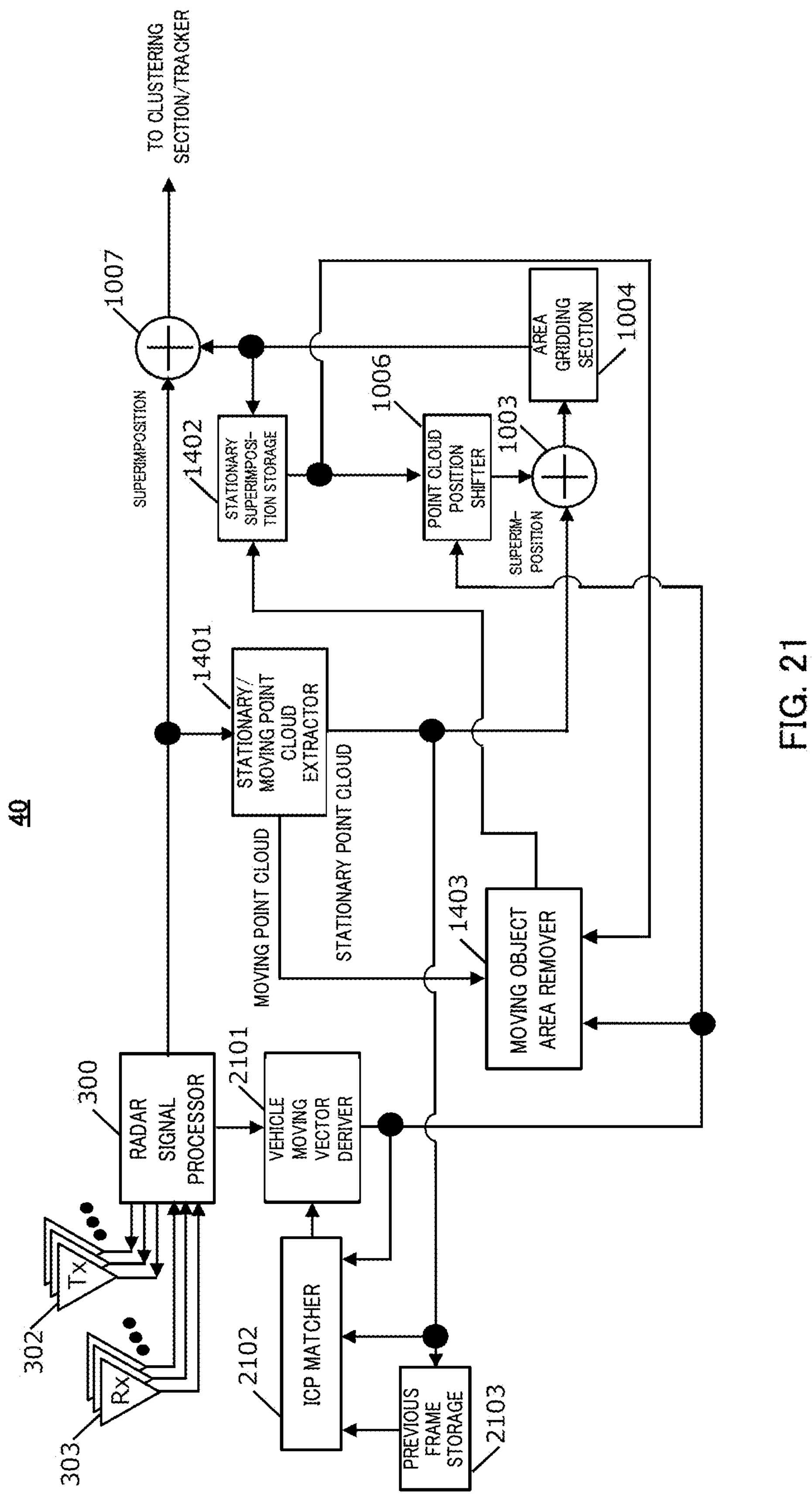
FIG. 21 illustrates an exemplary block configuration of the radar apparatus according to Embodiment 4.

FIG. 21 is a block diagram illustrating an exemplary configuration of radar apparatus 40 according to the present embodiment.

Radar apparatus 40 illustrated in FIG. 21 has a configuration in which vehicle moving vector deriver 1001 is replaced with vehicle moving vector deriver 2101 from the configuration of radar apparatus 10*a* illustrated in FIG. 14, and ICP matcher 2102 and previous frame storage 2103 are added.

Previous frame storage 2103 stores, for example, a stationary point cloud in the previous frame outputted from stationary/moving point cloud extractor 1401.

First, ICP matcher 2102 shifts the position of a point cloud stored in previous frame storage 2103 based on a moving vector estimated from the stationary object curve, and brings the point cloud close to the position of point cloud data obtained in the latest frame. ICP matcher 2102 then identifies corresponding points between the two point clouds of the previous frame and the latest frame, and calculates a transformation to minimize the difference between the positions of the corresponding points. ICP matcher 2102 repeats the above processing until the difference between the positions of the two point clouds of the previous frame and the latest frame falls within a predetermined margin of difference.

Vehicle moving vector deriver 2101 derives a moving vector of the vehicle using the output from ICP matcher 2102 in addition to the output from radar signal processor 300.

As described above, radar apparatus 40 compensates for a moving vector based on the comparison result between point cloud data of the current frame and point cloud data of the previous frame (e.g., result of ICP matching processing), thereby improving accuracy of deriving a moving vector of a vehicle compared to Embodiment 1.

Note that it may be assumed that reflection points of a reflection object are not exactly the same since the position of a vehicle may be different between the previous frame and the latest frame. This causes an outlier or the like, and thus radar apparatus 40 may perform processing such as removing the outlier.

Further, the present embodiment is based on the configuration of performing the ICP matching processing in addition to the configuration of radar apparatus 10*a* illustrated in FIG. 14, but the present disclosure is not limited thereto, and the ICP matching processing according to the present embodiment may be added to another configuration of the radar apparatus that performs processing of deriving a moving vector of a vehicle.

The embodiments of the present disclosure have been described above.

Although moving vector estimation of a vehicle using output data of radar signal processor 300 or an ICP matching result has been described, the present disclosure is not limited thereto. For example, instead of the ICP matching, other processing of performing position matching between point cloud data obtained in the previous frame and point cloud data obtained in the latest frame may be performed. In addition, estimation accuracy may be improved utilizing, for example, other information such as velocity information, yaw rate sensor information, and steering angle sensor information provided by a vehicle, in addition to the ICP matching result.

Although a method of utilizing point cloud data is not described in detail in the above-described embodiment, it is not limited to the utilization for controlling a vehicle in order to prevent a collision with an obstacle by performing processing such as clustering and tracking, and various utilization methods may be applied.

For example, the present disclosure is applicable to space detection for clarifying that it is a travelable area without an obstacle, a method of estimating the self-position of a vehicle by matching with map information etc. stored in advance, or a technique of simultaneously performing self-position estimation and environmental mapping such as simultaneous localization and mapping (SLAM).

It is further applicable to a configuration of a system for making fewer blind spots as possible for surrounding traffic participants by sharing generated point cloud data with external apparatuses such as surrounding vehicles or infrastructure.

In addition, it is also possible to alert a driver by displaying generated point cloud data on a display section such as a screen and surrounding a point cloud area corresponding to an obstacle with high potential for collision with a geometric pattern or the like. For example, even in a case where it is difficult to perform driving control by checking with eyes or using a camera image under bad weather such as snowfall or thick fog, it is expected to allow for continued driving by drawing point cloud data generated according to the above embodiments.

The values used in the above embodiments such as the number of past frames and the number of stationary objects used for generating point cloud data are examples, and they may be other values.

The radar apparatus according to an embodiment of the present disclosure includes, although not illustrated, a central processing unit (CPU), a storage medium such as a read only memory (ROM) in which a control program is stored, and a working memory such as a random access memory (RAM). In this case, the functions of the sections described above are implemented by the CPU executing the control program. However, the hardware configuration of the radar apparatus is not limited to that in this example. For example, the functional sections of the radar apparatus may be implemented as an integrated circuit (IC). Each functional section may be formed as an individual chip, or some or all of them may be formed into a single chip.

Although various embodiments have been described above with reference to the drawings, (it goes without saying that) the present disclosure is not limited to foregoing embodiments. It is obvious that those skilled in the art can conceive various modifications or variations within the scope recited in the claims, and such modifications and variations also naturally fall within the technical scope of the present disclosure. Further, any components in the embodiments described above may be combined as appropriate without departing from the gist of the present disclosure.

Further, any component with a suffix, such as "-er", "-or", or "-ar" in the above-described embodiments may be replaced with other terms such as "circuit (circuitry)", "assembly", "device", "unit", or "module".

The present disclosure can be realized by software, hardware, or software in cooperation with hardware.

Each functional block used in the description of each embodiment described above is typically realized by an LSI, which is an integrated circuit. The integrated circuit may control each functional block used for the description of the above embodiments and may include an input terminal and an output terminal. These may be individually formed as chips, or one chip may be formed so as to include a part or all of them. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used.

The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

SUMMARY OF THE PRESENT DISCLOSURE

A radar apparatus according to an embodiment of the present disclosure includes: signal processing circuitry, which, in operation, generates point cloud data for each frame based on a reflection wave signal resulting from a radar signal reflected by an object; extracting circuitry, which, in operation, extracts a first point cloud corresponding to a stationary object from the point cloud data; and superimposing circuitry, which, in operation, superimposes the point cloud data of a current frame and the first point cloud of a past frame.

In an embodiment of the present disclosure, the extracting circuitry extracts a plurality of the first point clouds from a plurality of the past frames respectively, and the radar apparatus further comprises second superimposing circuitry, which, in operation, superimposes the plurality of first point clouds respectively extracted from the plurality of past frames.

In an embodiment of the present disclosure, deriving circuitry, which, in operation, derives a moving vector of a vehicle on which the radar apparatus is mounted; and shifting circuitry, which, in operation, shifts, based on the moving vector, positions of the plurality of first point clouds respectively extracted from the plurality of past frames are further included, and the second superimposing circuitry superimposes the plurality of first point clouds, the positions of which have been shifted.

In an embodiment of the present disclosure, storing circuitry, which, in operation, stores the first point cloud for each of a plurality of areas resulting from dividing a detection target area of the radar apparatus is further included.

In an embodiment of the present disclosure, the extracting circuitry extracts a second point cloud corresponding to a moving object from the point cloud data, and the radar apparatus further comprises removing circuitry, which, in operation, determines whether to remove the first point cloud based on a position of the first point cloud and a position of the second point cloud.

In an embodiment of the present disclosure, clustering circuitry, which, in operation, generates a cluster for the object based on the point cloud data outputted from the superimposing circuitry; and tracking circuitry, which, in operation, performs tracking of the cluster are further included, and the extracting circuitry determines whether each point cloud in the point cloud data is the first point cloud or the second point cloud based on a result of the tracking.

In an embodiment of the present disclosure, storing circuitry, which, in operation, stores a plurality of the first point clouds over N frames and stores a moving vector of a vehicle on which the radar apparatus is mounted over the N frames; and second superimposing circuitry, which, in operation, superimposes the plurality of first point clouds respectively extracted from the N frames after positions of the plurality of first point clouds are shifted based on the moving vector are further included.

In an embodiment of the present disclosure, the storing circuitry stores the first point cloud and the moving vector from a frame where the vehicle on which the radar apparatus is mounted is not stopped, and does not store the first point cloud and the moving vector from a frame where the vehicle is stopped.

In an embodiment of the present disclosure, removing circuitry, which, in operation, removes the first point cloud when a position of a vehicle on which the radar apparatus is mounted before a power source of the vehicle is stopped is inconsistent with a position of the vehicle after the power source is restarted is further included.

In an embodiment of the present disclosure, removing circuitry, which, in operation, removes the first point cloud when a position of the first point cloud before a power source of a vehicle on which the radar apparatus is mounted is stopped is inconsistent with a position of the first point cloud after the power source is restarted is further included.

In an embodiment of the present disclosure, deriving circuitry, which, in operation, derives a moving vector of a vehicle on which the radar apparatus is mounted; and compensating circuitry, which, in operation, compensates for the moving vector based on a result of comparing the point cloud data of the current frame and the point cloud data of a previous frame are further included A point cloud generation method according to an embodiment of the present disclosure includes: generating, by a radar apparatus, point cloud data for each frame based on a reflection wave signal resulting from a radar signal reflected by an object; extracting, by the radar apparatus, a first point cloud corresponding to a stationary object from the point cloud data; and superimposing, by the radar apparatus, the point cloud data of a current frame and the first point cloud of a past frame.

While various embodiments have been described herein above, it is to be appreciated that various changes in form and detail may be made without departing from the sprit and scope of the invention(s) presently or hereafter claimed.

This application is entitled and claims the benefit of Japanese Patent Application No. 2023-010158, filed on Jan. 26, 2023, the disclosure of which including the specification, drawings and abstract is incorporated herein by reference in its entirety.

INDUSTRIAL APPLICABILITY

The present disclosure is suitable as a radar apparatus that detects an object.

REFERENCE SIGNS LIST

10, 10*a*, 10*b*, 20, 20*a*, 30, 40 Radar apparatus
300 Radar signal processor
301 High frequency transmitter
302 Transmission antenna
303 Reception antenna
304 High frequency receiver
305 A/D converter
306 RFFT
307 One-frame holder
308 VFFT
309 CFAR
310 DOA estimator
1001, 2101 Vehicle moving vector deriver
1002 Stationary point cloud extractor
1003, 1007 Superimposing section
1004 Area gridding section
1005, 1402 Stationary superimposition storage
1006 Point cloud position shifter
1401, 1603 Stationary/moving point cloud extractor
1403, 2004 Moving object area remover
1601 Clustering section
1602 Tracker
1701 Point cloud storage
1702 Vector storage
2001 Position detector
2002 Storage before power source stop
2003 Comparer
2102 ICP matcher
2103 Previous frame storage

The invention claimed is:

1. A radar apparatus configured to be mounted on a vehicle, the radar apparatus comprising:

signal processing circuitry, which, in operation, generates point cloud data for each frame of a plurality of frames based on a reflection wave signal resulting from a radar signal reflected by a stationary object and a moving object;

extracting circuitry, which, in operation, extracts a first point cloud corresponding to the stationary object from the point cloud data and a second point cloud corresponding to the moving object from the point cloud data;

superimposing circuitry, which, in operation, superimposes the point cloud data by superimposing the first point cloud and the second point cloud of a current frame and the first point cloud of a past frame, and outputs the superimposed point cloud data to a vehicle controlling circuitry that controls the vehicle based on the superimposed point cloud data, and removing circuitry, which, in operation, detects a position of the second point cloud of the current frame is a position of the first point cloud of the past frame, and removes the first point cloud of the past frame from the superimposed point cloud data, in response to the position of the second point cloud of the current frame being detected as the position of the first point cloud of the past frame.

2. The radar apparatus according to claim 1, wherein, the extracting circuitry extracts a plurality of first point clouds from a plurality of past frames, respectively, and the radar apparatus further comprises second superimposing circuitry, which, in operation, superimposes the plurality of first point clouds respectively extracted from the plurality of past frames.

3. The radar apparatus according to claim 2, further comprising:

deriving circuitry, which, in operation, derives a moving vector of the vehicle; and shifting circuitry, which, in operation, shifts, based on the moving vector, positions of the plurality of first point clouds respectively extracted from the plurality of past frames, wherein, the second superimposing circuitry superimposes the plurality of first point clouds with the positions of the plurality of first point clouds shifted.

4. The radar apparatus according to claim 1, further comprising:

storing circuitry, which, in operation, stores the first point cloud of the current frame in case a position of the first point cloud of the current frame coincides with an area where the first point cloud of the past frame is not stored among a plurality of areas resulting from dividing a detection target area of the radar apparatus.

5. The radar apparatus according to claim 1, further comprising:

clustering circuitry, which, in operation, generates a cluster for the stationary object and the moving object based on the point cloud data outputted from the superimposing circuitry; and tracking circuitry, which, in operation, performs tracking of the cluster, wherein, the extracting circuitry determines whether each point cloud in the point cloud data is the first point cloud or the second point cloud based on a result of the tracking.

6. The radar apparatus according to claim 1, further comprising:

storing circuitry, which, in operation, stores a plurality of first point clouds over N frames and stores a moving vector of the vehicle over the N frames, N being an integer greater than or equal to 2; and second superimposing circuitry, which, in operation, superimposes the plurality of first point clouds respectively extracted from the N frames after positions of the plurality of first point clouds are shifted based on the moving vector.

7. The radar apparatus according to claim 6, wherein the storing circuitry stops to store the first point cloud and the moving vector over the N frames in a case where a predetermined time elapses after the vehicle changes from a traveling state to a stopped state, or in a case where the vehicle repeats the traveling state and the stopped state a predetermined number of times.

8. The radar apparatus according to claim 1, further comprising:

removing circuitry, which, in operation, removes the first point cloud when a position of the vehicle before a power source of the vehicle is stopped is inconsistent with a position of the vehicle after the power source is restarted.

9. The radar apparatus according to claim 1, further comprising:

removing circuitry, which, in operation, removes the first point cloud when a position of the first point cloud before a power source of the vehicle is stopped is inconsistent with a position of the first point cloud after the power source is restarted.

10. The radar apparatus according to claim 1, further comprising:

deriving circuitry, which, in operation, derives a moving vector of the vehicle; and compensating circuitry, which, in operation, compensates for the moving vector based on a result of comparing the point cloud data of the current frame and the point cloud data of a previous frame.

11. A point cloud generation method using a radar apparatus configured to be mounted on a vehicle, comprising:

generating, by the radar apparatus, point cloud data for each frame of a plurality of frames based on a reflection wave signal resulting from a radar signal reflected by a stationary object and a moving object;

extracting, by the radar apparatus, a first point cloud corresponding to the stationary object from the point cloud data and a second point cloud corresponding to the moving object from the point cloud data;

superimposing, by the radar apparatus, the point cloud data by superimposing the first point cloud and the second point cloud of a current frame and the first point cloud of a past frame;

detecting, by the radar apparatus, a position of the second point cloud of the current frame is a position of the first point cloud of the past frame;

removing, by the radar apparatus, the first point cloud of the past frame from the superimposed point cloud data, in response to detecting the position of the second point cloud of the current frame is the position of the first point cloud of the past frame; and outputting, by the radar apparatus, the superimposed point cloud data to a vehicle controlling circuitry that controls the vehicle based on the superimposed point cloud data.

12. The point cloud generation method according to claim 11, further comprising:

extracting, by the radar apparatus, a plurality of first point clouds from a plurality of past frames, respectively; and superimposing, by the radar apparatus, the plurality of first point clouds respectively extracted from the plurality of past frames.

13. The point cloud generation method according to claim 12, further comprising:

deriving, by the radar apparatus, a moving vector of the vehicle;

shifting, by the radar apparatus, based on the moving vector, positions of the plurality of first point clouds respectively extracted from the plurality of past frames; and superimposing, by the radar apparatus, the point cloud data of the current frame and the plurality of first point clouds with the positions of the plurality of first point clouds shifted.

14. The point cloud generation method according to claim 11, further comprising:

storing, by the radar apparatus, the first point cloud of the current frame in case a position of the first point cloud of the current frame coincides with an area where the first point cloud of the past frame is not stored among a plurality of areas resulting from dividing a detection target area of the radar apparatus.

15. The point cloud generation method according to claim 11, further comprising:

generating, by the radar apparatus, a cluster for the stationary object and the moving object based on the point cloud data superimposed on the first point cloud of the past frame;

performing, by the radar apparatus, tracking of the cluster; and determining, by the radar apparatus, whether each point cloud in the point cloud data is the first point cloud or the second point cloud based on a result of the tracking.

16. The point cloud generation method according to claim 11, further comprising:

storing, by the radar apparatus, a plurality of first point clouds over N frames and storing a moving vector of the vehicle over the N frames, N being an integer greater than or equal to 2; and superimposing, by the radar apparatus, the plurality of first point clouds respectively extracted from the N frames after positions of the plurality of first point clouds are shifted based on the moving vector.

17. The point cloud generation method according to claim 16, further comprising:

stopping storing, by the radar apparatus, the first point cloud and the moving vector over the N frames in a case where a predetermined time elapses after the vehicle changes from a traveling state to a stopped state, or in a case where the vehicle repeats the traveling state and the stopped state a predetermined number of times.

18. The point cloud generation method according to claim 11, further comprising:

removing, by the radar apparatus, the first point cloud when a position of the vehicle before a power source of the vehicle is stopped is inconsistent with a position of the vehicle after the power source is restarted.

19. The point cloud generation method according to claim 11, further comprising:

removing, by the radar apparatus, the first point cloud when a position of the first point cloud before a power source of the vehicle is stopped is inconsistent with a position of the first point cloud after the power source is restarted.

20. The point cloud generation method according to claim 11, further comprising:

deriving, by the radar apparatus, a moving vector of the vehicle; and compensating, by the radar apparatus, for the moving vector based on a result of comparing the point cloud data of the current frame and the point cloud data of a previous frame.

* * * * *